Aug. 14, 1951     C. E. GERMANTON     2,564,429
GROUND TRAINER FOR AIRCRAFT PERSONNEL
Filed Oct. 12, 1945     9 Sheets-Sheet 2

INVENTOR
C. E. GERMANTON
BY P. C. Smith
ATTORNEY

Aug. 14, 1951  C. E. GERMANTON  2,564,429
GROUND TRAINER FOR AIRCRAFT PERSONNEL
Filed Oct. 12, 1945  9 Sheets-Sheet 5

INVENTOR
C.E. GERMANTON
BY P. C. Smith
ATTORNEY

Aug. 14, 1951 C. E. GERMANTON 2,564,429
GROUND TRAINER FOR AIRCRAFT PERSONNEL
Filed Oct. 12, 1945 9 Sheets-Sheet 6
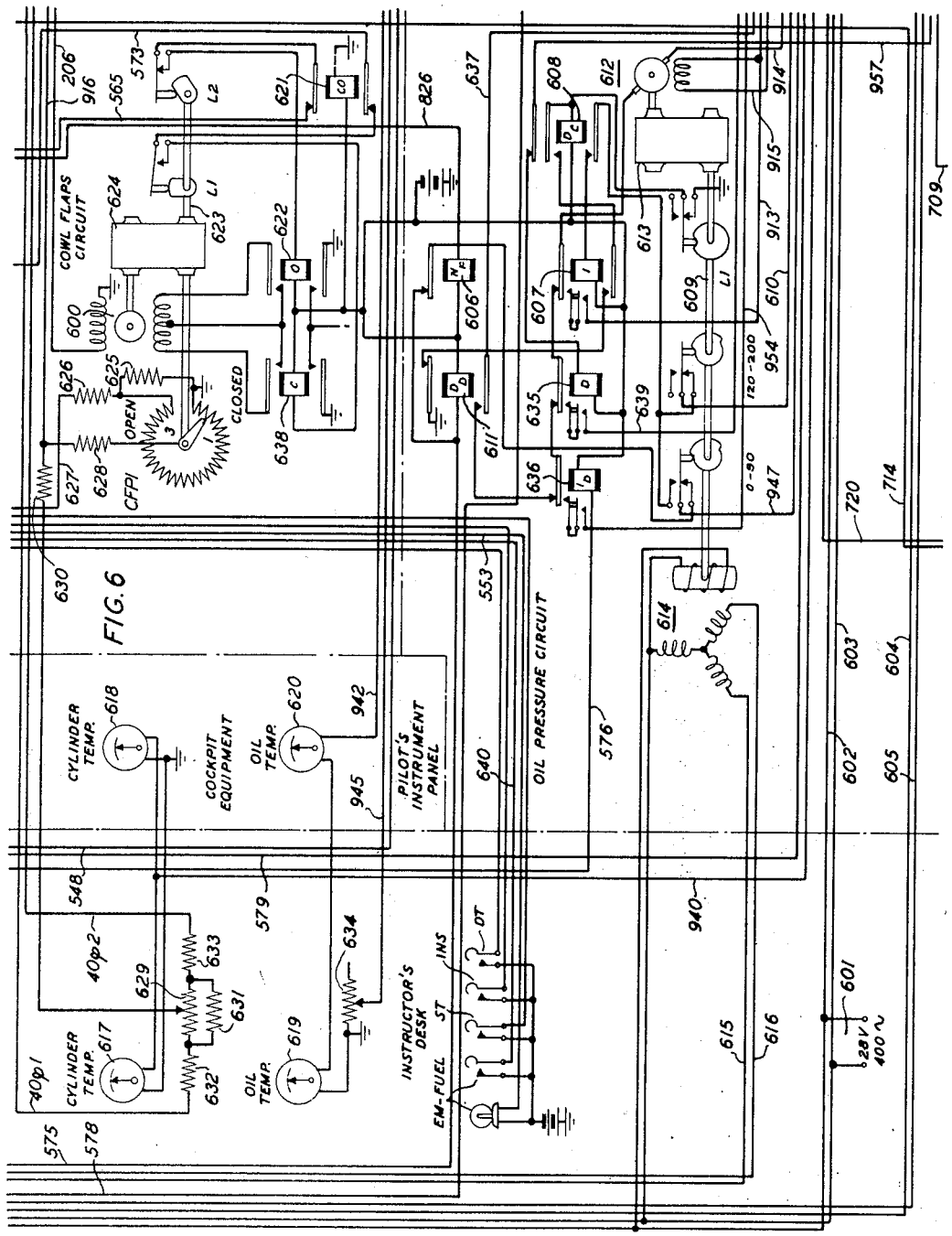
INVENTOR
C. E. GERMANTON
BY
P. C. Smith
ATTORNEY

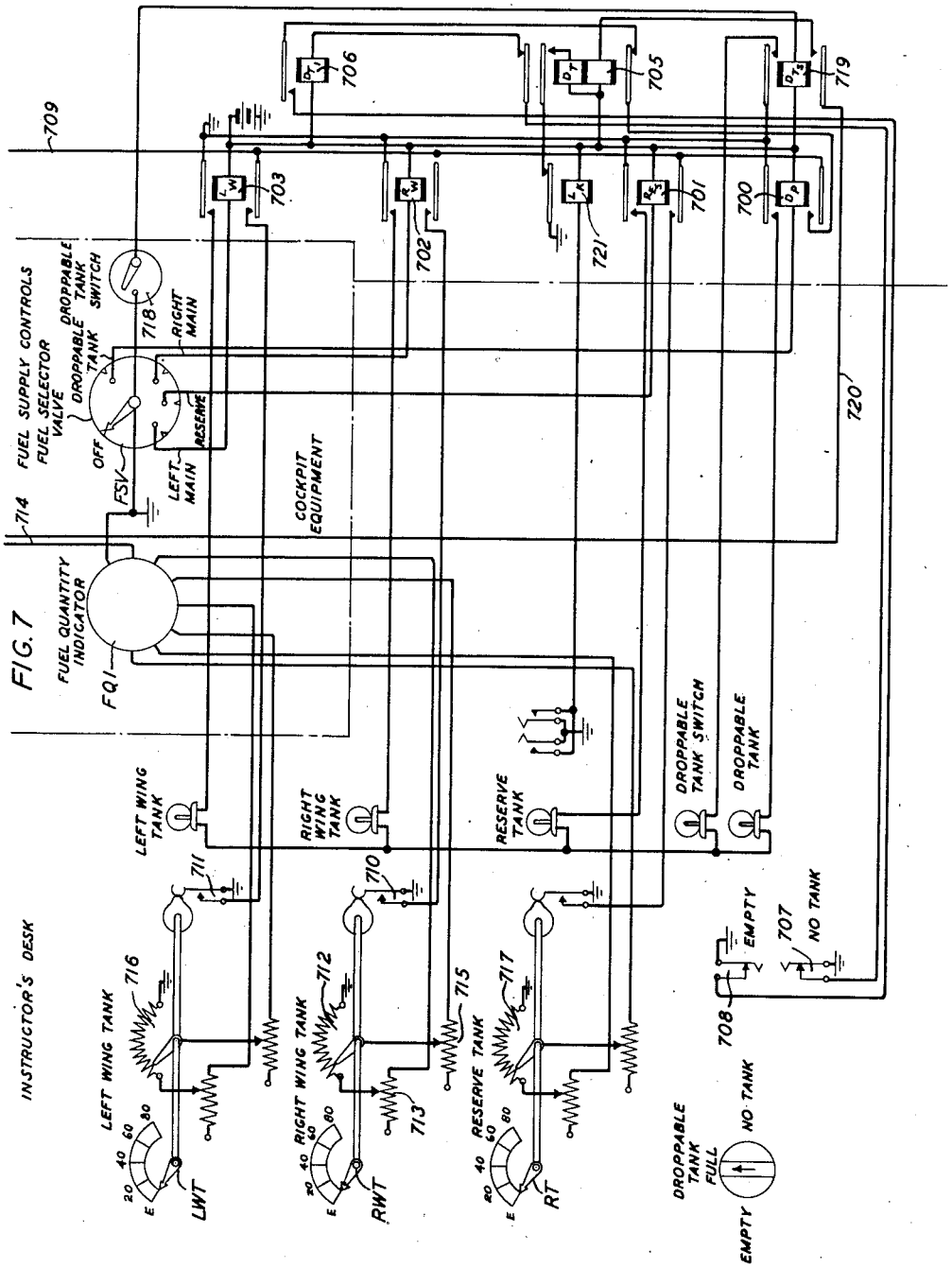

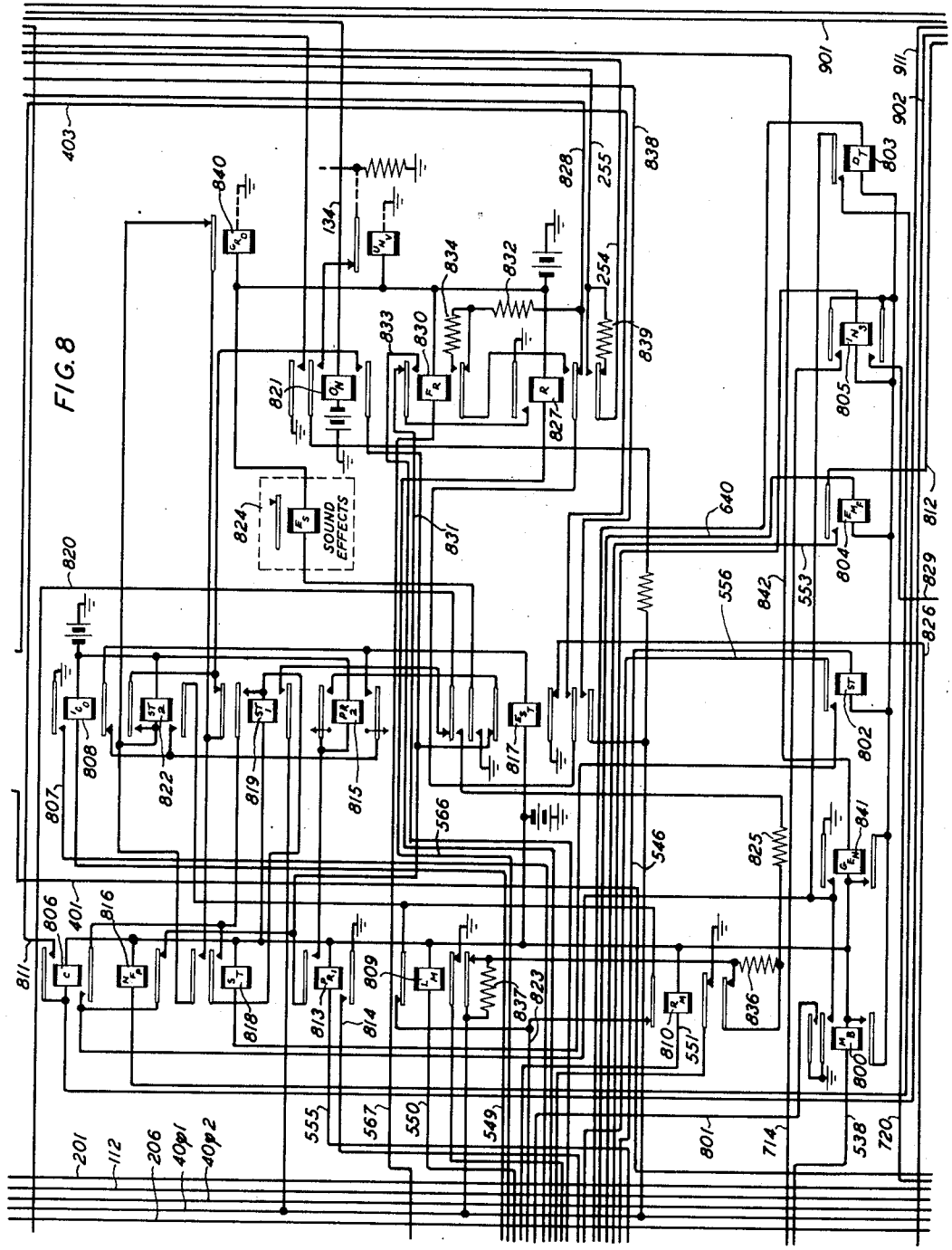

Aug. 14, 1951          C. E. GERMANTON          2,564,429
                GROUND TRAINER FOR AIRCRAFT PERSONNEL
Filed Oct. 12, 1945                           9 Sheets-Sheet 9
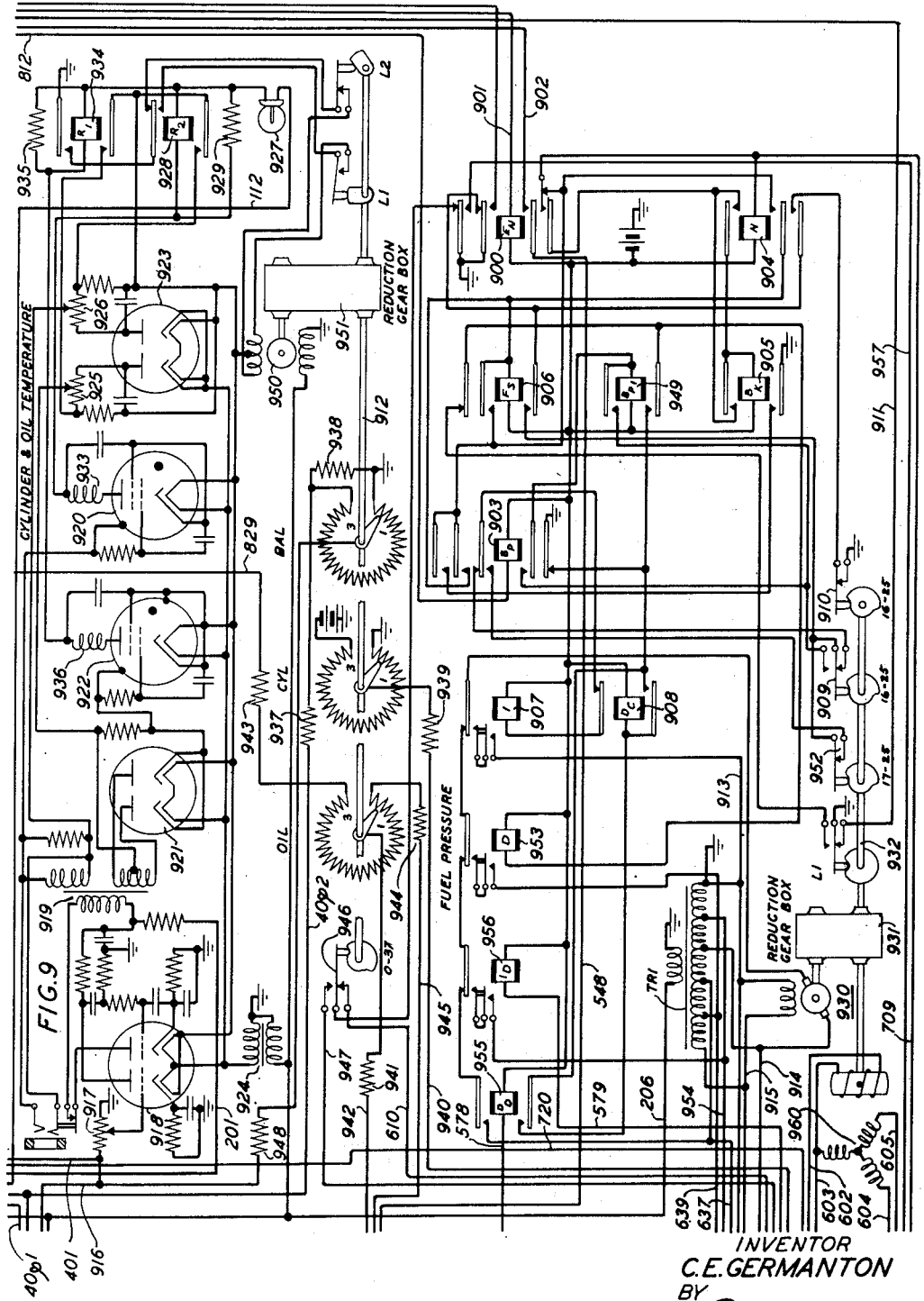
INVENTOR
C. E. GERMANTON
BY
P. C. Smith
ATTORNEY Patented Aug. 14, 1951

2,564,429

UNITED STATES PATENT OFFICE 2,564,429

GROUND TRAINER FOR AIRCRAFT PERSONNEL

Charles E. Germanton, Summit, N. J., assignor to Bell Telephone Laboratories, Incorporated, New York, N. Y., a corporation of New York Application October 12, 1945, Serial No. 622,070

21 Claims. (Cl. 35—12)

This invention relates to an aircraft trainer in which the operation of controls similar to those of a standard aircraft by the pilot causes the operation of instruments on the pilot's instrument panels and of instruments at an instructor's desk to simulate the instrument operations of an actual aircraft in flight whereby the pilot may be given ground training commensurate with actual training in an airplane and under all flight conditions which might be encountered during an actual flight.

In the training of pilots it has been the practice heretofore to give them basic training in aircraft of the trainer type and in ground trainers equipped to give them some of the fundamentals of instrument flight. To familiarize the pilots with the handling of the power and other equipment of airplanes, ground courses have been given with such equipment. Following such basic training it has then been the practice to train pilots extensively in the flight of actual aircraft which they will later be assigned to fly.

Aircraft are costly to build, to fly and to maintain and their use for intensive training purposes by pilots who have not yet attained their skills in flying them introduces a great hazard both to the equipment and to the pilots during the training period and obviously withdraws such aircraft from their more valuable use in actual service.

From actual experience it has been found that after the pilots have had all of their basic training in flying and in the operation of equipment of airplanes, the actual flying hours in the use of airplanes which they will ultimately be assigned to fly may be materially reduced through the use of a ground trainer designed to simulate all of the flight and operational functions of the type of airplanes to which they will later be assigned. A ground trainer of this type for training the crew personnel of a multiengined seaplane has been fully disclosed in the application of R. C. Davis, E. J. Fogarty and R. O. Rippere, Serial No. 542,986, filed June 30, 1944. In the application of E. J. Fogarty and R. O. Rippere, Serial No. 622,068 filed concurrently herewith, a ground trainer has been disclosed in which a pilot may be trained to perform all of the flight functions which would be required to actually fly an airplane of a single-engined high speed type which the trainer is designed to simulate. The latter application is more particularly directed to the flight functions performed by the pilot under the direction of an instructor and under flight and operating conditions imposed by the instructor. The present invention relates more particularly to such a trainer in which the pilot may be trained in the operation of the engine whereby he is enabled to experience all of the effects upon flight which would result from either the proper or faulty operation of the engine. The Patent 2,506,949 to F. M. Burelbach and J. J. Lukacs of May 9, 1950, also discloses a trainer in which the pilot may be trained in the operation of an engine.

It is therefore an object of the present invention to provide a ground trainer in which a pilot may be trained to perform all operational functions concerning the engine of an airplane which would be required to actually control the engine of an airplane which the trainer is designed to simulate.

One feature of the invention is the provision of an engine control circuit which is responsive to ignition, start, carburetor mixture, propeller governor and throttle controls accessible to the pilot, to stimulate the starting and control of the engine of the airplane which the trainer is designed to simulate.

Another feature of the invention is the provision of a manifold pressure circuit for the simulated engine which is responsive to the engine control circuit, to the R. P. M. circuit, to the altimeter circuit of the trainer, to supercharger speed and throttle controls accessible to the pilot, and to a control at the instructor's desk, which manifold pressure circuit is instrumental in controlling an associated manifold pressure motor control circuit to control other control circuits of the trainer and to control the operation of the manifold pressure indicators on the pilot's and instructor's instrument panels.

A further feature of the invention is the provision of an R. P. M. circuit for the simulated engine which is responsive to the engine control circuit, to the manifold pressure circuit, to the R. P. M. comparison circuit, to the true air speed circuit of the trainer and to the throttle and propeller governor controls accessible to the pilot, which R. P. M. circuit is instrumental in controlling an associated R. P. M. motor control circuit to control other control circuits of the trainer, to control the operation of tachometers on the pilot's and instructor's instrument panels, to control a sound effects circuit which simulates the explosion noises of the simulated engine, and to control a vibrator circuit which simulates the vibration incident to the operation of the engine and the engine-driven propeller.

A further feature of the invention is the provision of a first circuit which continuously compares signals of variable amplitude applied under the control of the throttle and under the control of the propeller governor and the provision of a second circuit which continuously compares signals of variable amplitude applied under the control of the propeller governor and the true air speed motor control circuit of the trainer for controlling the R. P. M. circuit.

A further feature of the invention is the provision of a thrust circuit which is responsive to the engine control, to the R. P. M. and to the manifold pressure circuits of the simulated engine and to the true air speed and altimeter circuits of the trainer, which thrust circuit is instrumental in controlling an associated thrust motor control circuit to control the operation of other circuits of the trainer.

A further feature of the invention is the provision of an engine fuel pressure motor circuit which is responsive to the engine control and to the R. P. M. circuits of the simulated engine, to controls at the instructor's desk and to fuel supply controls accessible to the pilot for controlling the operation of engine fuel pressure indicators on the pilot's and instructor's instrument panels.

A further feature of the invention is the provision of an engine cowl flaps motor circuit which is responsive to controls accessible to the pilot and to controls at the instructor's desk for controlling the engine cylinder and oil temperature motor control circuit of the simulated engine.

A further feature of the invention is the provision of an engine oil pressure motor circuit which is responsive to the engine control, to the engine cylinder and oil temperature and to the R. P. M. circuits of the simulated engine, and to controls at the instructor's desk for controlling the engine cylinder and oil temperature motor control circuit and for controlling the operation of engine oil pressure indicators on the pilot's and instructor's instrument panels.

A further feature of the invention is the provision of an engine cylinder and oil temperature motor circuit which is responsive to the cowl flaps motor circuit, to the engine control circuit, to the true air speed and thrust circuits of the trainer and to controls at the instructor's desk for controlling the engine oil pressure motor circuit and for controlling the operation of engine cylinder and oil temperature indicators on the pilot's and instructor's instrument panels.

Other features of the invention will become apparent upon the consideration of the following detailed description of the invention when read in connection with the accompanying drawing in which:

Fig. 1 shows the R. P. M. motor control circuit of the trainer together with one of the potentiometers and a tachometer controlling self-synchronous motor operated thereby;

Fig. 2 shows in the upper portion thereof the comparison circuits which function in the control of the R. P. M. motor control circuit of Fig. 1; in the central portion thereof relays which function in the control of the manifold pressure motor control circuit of Fig. 3; and in the lower portion thereof, additional potentiometers operable by the R. P. M. motor control circuit of Fig. 1;

Fig. 3 shows in the upper left portion thereof a schematic disclosure of the true air speed motor control circuit of the trainer and certain of the continuously variable autotransformers and potentiometers operated thereby; in the upper right portion thereof a schematic disclosure of manifold pressure motor control circuit, a self-synchronous generator driven thereby for controlling manifold pressure indicators mounted on the pilot's and instructor's instrument panels, and certain of the potentiometers driven by the manifold pressure motor control circuit; and in the lower portion thereof a schematic disclosure of the altimeter motor control circuit of the trainer and certain of the potentiometers driven thereby;

Fig. 6 shows in the upper right portion thereof the cowl flaps motor circuit; in the lower right portion thereof the engine oil pressure motor circuit; in the upper central portion thereof cylinder and oil pressure indicators mounted in the cockpit of the trainer; and in the left portion thereof cylinder and oil temperature indicators, keys and lamps located at the instructor's desk;

Fig. 7 shows in the upper central portion thereof the fuel quantity indicator and fuel supply controls located in the cockpit of the trainer and accessible to the pilot; in the left portion thereof fuel supply controls and signals located at the instructor's desk; and in the right portion thereof relay equipment located in apparatus cabinets associated with the trainer;

Fig. 8 shows the engine control circuit located in the apparatus cabinet associated with the trainer;

Fig. 9 shows in the upper portion thereof the cylinder and oil temperature motor and control circuit and in the lower portion thereof the fuel pressure motor circuit;

Fig. 10 shows schematically the essential elements of the trainer; and

Fig. 11 is a diagram showing how the several figures of the drawing should be assembled to disclose the complete invention.

Referring first to Fig. 10, the trainer comprises a "mock-up" 1000 of the fuselage of an airplane so constructed as to closely resemble in size, arrangement and appearance the fuselage of an actual airplane which the trainer is designed to simulate. The trainer being designed to simulate a single-seated airplane of the fighter type, the cockpit is equipped with a regulation pilot's seat 1001, control stick 1002, rudder pedals 1003 and with all of the controls and instruments which the pilot would require in the operation and flight of the actual airplane. Connected by a cable 1004 to the trainer 1000 is an instructor's desk 1005 at which are located panels 1006 and 1007, mounting instruments which duplicate the instruments of the trainer, controls for enabling the instructor to impose operating and flight conditions upon the trainer which might be encountered in the operation and flight of an actual airplane, and signals for supervising the response of the pilot under training to the instructions and conditions imposed by the instructor. Also connected to the trainer 1000 and to the instructor's desk 1005 by other cables 1008 and 1009 are apparatus cabinets 1010 which contain a power supply, motor units, motor controls and miscellaneous circuits which control the operation of apparatus in the trainer and at the instructor's desk.

The motor control circuits and associated motor units are in general associated in pairs. For example, the manifold pressure motor control circuit schematically illustrated in Fig. 3 and all of the potentiometers and continuously variable autotransformers controlled thereby and the hydraulic pressure motor control circuit (not disclosed) with the potentiometers and continuously variable autotransformers associated therewith, would constitute a single assembly. Each motor control circuit comprises a direct current reversible motor which through a reduction gear box drives a main driving shaft which in turn may drive one or more self-synchronous generators for controlling instruments remotely mounted on instrument panels of the trainer or on the instructor's desk, may drive potentiometers or variable autotransformers for controlling other motor control circuits of the trainer, and drives limit switches to insure that the driving motor will be arrested before the sliders of the potentiometers or autotransformers are driven beyond the ends of the windings with which they are associated. The relays, condensers, resistances, control rheostats, testing jacks and electronic devices associated with the equipment mounted on the motor plate are located on an apparatus rack positioned above and secured to the motor plate. Several of these motor plates and mounting rack assemblies are mounted one above the other in the apparatus cabinets 1010 of Fig. 10.

Figure 1:
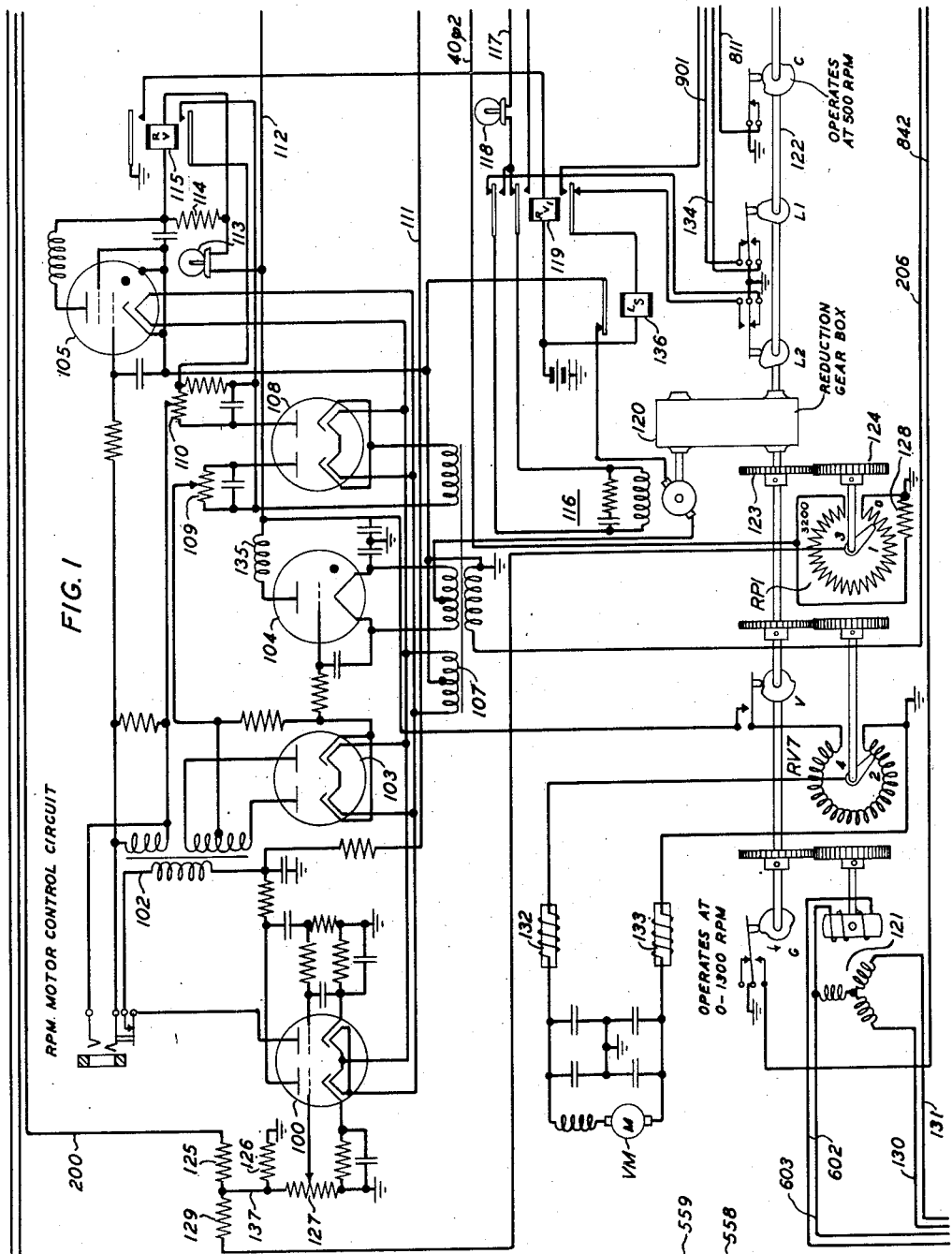

Each of the motor control circuits, for example, the circuit disclosed in Fig. 1, is of the type disclosed and fully described in the application of Albert-Davis-Gumley-Holden, Serial No. 502,484, filed September 15, 1943, which issued October 14, 1947, as Patent No. 2,428,767. In general, the circuit for controlling the motor 116 comprises a dual triode amplifier tube 100 which receives a signal incoming on signal control conductor 137, amplifies it and applies it through the step-up transformer 102 to the plates of the dual diode rectifier tube 103. The tube 103 serves as a full wave rectifier to rectify the output potential from the tube 100 and to apply it as a positive potential to the grid of the gas-filled tube 104. The output potential of tube 100 is also applied through the upper secondary winding of transformer 102 to the control grid of the gas-filled tube 105. Direct current for furnishing grid bias to the control grids of tubes 104 and 105 is supplied from the right secondary winding of power transformer 107 through the dual diode rectifier tube 108 under the control of the grid bias control rheostats 109 and 110. Filament heating current for all of the tubes is supplied from the other secondary windings of the power transformer 107. Plate potential is supplied to the plates of amplifier tube 100 over conductor 111 from the 130-volt bus bar 201 and 60-cycle plate potential is applied from the 115-volt bus bar to the plate of tube 104 and through resistance lamp 113 and thence in parallel through resistance 114 and the winding of the RV relay 115 to the plate of tube 105.

The motor 116 is of the direct current reversible type whose stator circuit is energized by current from the direct current bus bar 201 over conductor 117 and through the lamp resistance 118 under the control of the RV1 reversing relay 119 which is, in turn, under the control of the plate relay 115 associated with the gas-filled tube 105, and whose rotor winding is energized by positive impulses of current transmitted therethrough by the firing of the gas-filled tube 104. When the input signal potential applied to conductor 137 is in phase with the potential applied to the plate of tube 105, relays 115 and 119 will operate and since the rectifier tube 103 functions to make the grid of tube 104 more positive in response to both half waves of a signal regardless of the phase of the signal with respect to the phase of the potential applied to the plate of tube 104, the tube 104 will cause the transmission of an impulse through the rotor circuit of motor 116 each time that the tube 104 fires on each positive half wave of the plate potential and the motor will rotate in one direction. In response to a signal which is out of phase with the potential applied to the plate of tube 105, tube 105 will not conduct and consequently relays 115 and 119 will not operate, but since tube 104 will fire on each positive half wave of the potential applied to its plate, the motor 116 will be operated in response to the incoming signal in the reverse direction of rotation.

Potentiometers and autotransformers which are driven by a motor control circuit may enter into the control of several other motor control circuits of the trainer. For example, the R. P. M. motor control circuit of Fig. 1 has an autotransformer RV7 in the circuit of the vibrator motor VM, a potentiometer RP1 associated with its own control circuit and serving as a balancing potentiometer, a potentiometer RP8 shown in Fig. 2 associated with the sound effects circuit (not shown), a potentiometer RP3 associated with the high and low speed supercharger relays 203 and 204 and with the engine start relay 205 of Fig. 2, a potentiometer RP4 associated with the manifold pressure circuit of Fig. 4, and a potentiometer RP10 associated with the thrust circuit of Fig. 4. As previously stated these autotransformers and potentiometers, together with the motor 116, the reduction gear box 120, the limit switches L1 and L2, the cam-operated switches C, V and G, and the self-synchronous transmitter or generator 121 are all mounted on the motor plate of the R. P. M. and hydraulic pressure motor units, the autotransformers, potentiometers and synchronous transmitters being driven through gearing from the main drive shaft 122 such, for example, as the gears 123 and 124 which drive the balancing potentiometer RP1. The shaft 122 is driven by the motor 116 through the reduction gear box 120.

The motor 600 of Fig. 6 and the motor 950 of Fig. 9 are of the reversible alternating current shaded pole type, each having a main stator winding and shaded pole windings. A motor of this type is caused to rotate in one direction by energizing its stator winding and short-circuiting one of the shaded pole windings, and to rotate in the opposite direction by energizing its stator winding and short-circuiting its other shaded pole winding.

Figure 5:
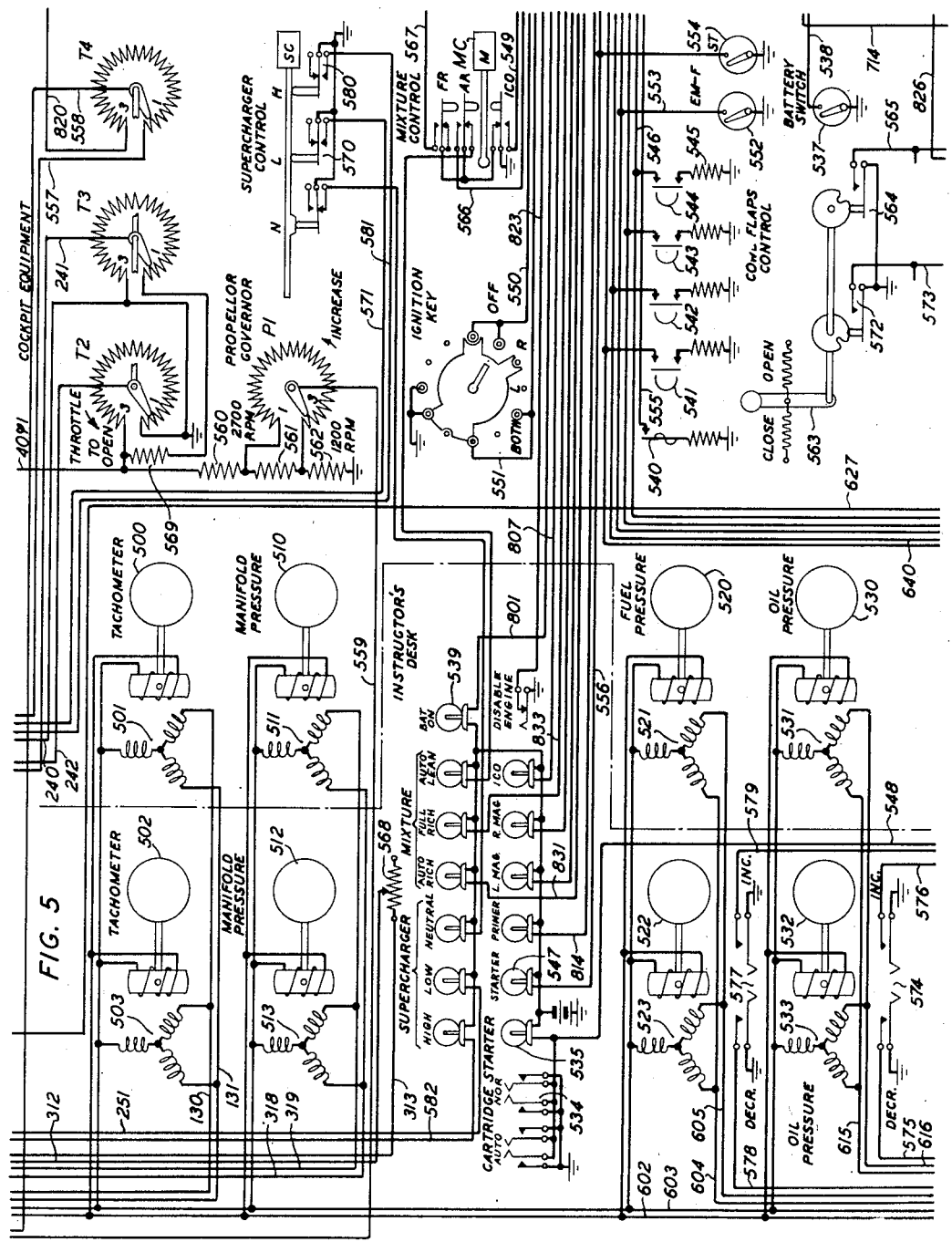
Fig. 5 shows on the right of the dot-dash line instruments and controls located in the cockpit of the trainer and accessible to the pilot and on the left of the dot-dash line instruments, switches and signal lamps located at the instructor's desk.

The instruments on the pilot's and instructor's instrument panels, illustrated in Figs. 5, 6 and 7, are identical in appearance to the instruments which would be found on the corresponding instrument panels of an actual airplane. Some of these instruments, such as for example the tachometers 500 and 502, the manifold pressure indicators 510 and 512, the fuel pressure gauges 520 and 522, and the oil pressure gauges 530 and 532 are driven by self-synchronous motors or receivers associated therewith by which they are remotely controlled from synchronous transmitters of the same type associated with motor control circuits. For example, the synchronous receivers or motors 501 and 503 which drive the tachometers 500 and 502 are driven by the synchronous transmitter 121 associated with the R. P. M. motor control circuit of Fig. 1.

Since the present invention is primarily concerned with those portions of the apparatus and circuits of the trainer which function in the training of the pilot in the operation and control of the engine of the airplane which the trainer simulates, the flight controls, flight instruments and motor control circuits of the trainer which are responsive to the flight controls, for simulating flight conditions and for simulating the operation of the flight instruments, have not been disclosed herein. For a full disclosure of such apparatus and circuits reference may be had to the application of E. J. Fogarty and R. O. Rippere, Serial No. 622,068, filed concurrently herewith. Since, however, the operation of the engine of an airplane is affected by the altitude at which a flight is being conducted and by the true air speed of the flight, these effects upon the circuits which simulate the operation of the engine are introduced by the altimeter and true air speed motor control circuits indicated schematically by the boxes so labeled in Fig. 3 and by the autotransformers and potentiometers operated thereby.

The apparatus employed in carrying out the invention having now been described the operation of the apparatus in training a pilot will now be discussed.

*Preparing the trainer for operation*

At the instructor's desk all switches, keys and controls relating to the simulation of the operation of the engine are set in the normal or "off" position except as follows: The fuel quantity controls LWT, RWT, and RT shown on Fig. 7 are set to their full or upper limits, the cartridge starter switch 534, Fig. 5, should be momentarily operated whereupon the associated lamp 535 will light and remain lighted; and the wheel chock key (not shown) is operated to the "in" position.

The battery supply switch 537 in the cockpit is first operated by the pilot thereby establishing a circuit from ground thereover, over conductor 538 through the winding of the MB relay 800 to battery, whereupon relay 800 operates and establishes a circuit from ground over its upper contacts, over conductor 801, through lamp 539 at the instructor's desk to battery thereby informing the instructor that the pilot has turned on the battery supply. The pilot also sees that all circuit breakers including the circuit breakers 541, 542, 543 and 544 are closed.

Since the engine is not running the engine (EN) relay 900, associated with the fuel pressure circuit of Fig. 9, is operated over a circuit extending from battery through its winding, over conductor 901 to ground over the normally closed contacts of the L1 limit switch of the R. P. M. motor unit of Fig. 1. With relay 900 operated, when the switch 534 is operated to simulate the placing of a starting cartridge in the engine, a circuit is established from ground over the contacts of such switch, over conductor 548, over the inner lower front contact of relay 900, over conductor 902 and through the winding of the C relay 806 to battery. When the switch 534 is released, relay 806 should remain operated over a holding circuit extending over its upper front contact, over conductor 811 and over the normally closed contacts operable by cam C of the R. P. M. motor unit of Fig. 1. As long as switch 534 is operated or relay 806 remains operated, lamp 535 associated with switch 534 remains lighted, the circuit for lamp 535 controlled by relay 806 extending from ground over conductor 811, over the upper contacts of relay 806 and as traced to conductor 548 and through the lamp to battery.

The closure of circuit breaker 544 establishes a circuit from ground through resistance 454, over the contacts of the circuit breaker, over conductor 546 through the winding of the ST relay 802 and thence to battery over the lower contacts of relay 800. Similarly, the closure of circuit breakers 541, 542 and 543 establishes circuits for the DT relay 803, for the EMF relay 804 and for the INS relay 805.

The pilot also operates the fuel selector valve FSV to select a tank with fuel as indicated by the fuel quantity indicator FQI. It will be assumed that the droppable tank, the left wing tank, the right wing tank and the reserve tank are all full and are so indicated by the indicator FQI and that the pilot moves the valve handle to select the droppable tank. The selector valve used on the airplane has been modified to simulate the selection of fuel tanks by the addition of cam operated switches which are selectively operated by the movement of the valve handle and by the provision of the fuel selection relays 700, 701, 702 and 703. With the valve handle operated to the droppable tank selection position, ground is connected to the droppable tank contact of the selector valve mechanism, through the winding of the DP relay 700 to battery. With relay 700 operated a circuit is established from ground over the normally closed contacts 707 of the droppable tank switch at the instructor's desk, over the upper back contact of the DT relay 705 and through the winding of the DTI relay 706 to battery. Thereupon a circuit is established from ground, over the normally closed contacts 708 of the droppable tank switch at the instructor's desk, over the contacts of relay 706, over the lower back contact of relay 705, over the lower contacts of relay 700, over conductor 709 and through the winding of the N relay 904 of the fuel pressure circuit to battery. Relay 904, with relay 900 previously operated, establishes the circuit of the BK relay 905 extending from ground on conductor 709, over the lower alternate contacts of relay 900, over the upper contacts of relay 904 and through the winding of relay 905 to battery.

For starting the engine the mixture control MC, Fig. 5, of the cockpit equipment should be in the idle cut off (ICO) position in which position a circuit is established from ground over the lower contacts associated with the mixture control lever, over conductor 549 and through the ICO relay 808 to battery. Relay 808, upon operating, establishes a circuit from ground over its upper contacts and over conductor 807 through the ICO lamp at the instructor's desk to battery for indicating to the instructor that the pilot has not operated the mixture control lever out of the ICO position. The pilot operates the ignition key of the cockpit equipment to the both position in which ground is disconnected from both conductors 550 and 551 thereby opening the circuits of the left magneto (LM) relay 809 and the right magneto (RM) relay 810 which thereupon release.

Simulation of fuel pressure

Before the engine priming may be simulated, the presence of fuel pressure must be simulated by means of the operation of the fuel selector valve as previously described and by the operation of the emergency fuel pump switch 552 of the cockpit equipment. The operation of switch 552 connects ground to conductor 553 which establishes a circuit through the EM-fuel lamp at the instructor's desk and establishes a circuit over contacts of the emergency fuel (EMF) relay 804 previously operated by the closure of the circuit breaker 542, thence over conductor 812 through the winding of the BP relay 903 of the fuel pressure circuit to battery.

With relays 903 and 905 both operated, the circuit of the fuel selector switch (FS) relay 906 is established from ground over the lower contacts of relay 905, over the outer upper and middle upper contacts of relay 903 and through the winding of relay 906 to battery, whereupon relay 906 closes at its lower contacts a circuit for the increase pressure (I) relay 907. This circuit may be traced from battery through the winding of relay 907, over the back contact of the DC relay 908, over the inner upper front contact of relay 903, over the contacts of the spring assembly 952 operable by the cam 17—25, over the lower contacts of relay 906 and over the lower contacts of relay 904 to ground over the normally closed cam operated spring assembly 910. The limit switch LI opens the circuit of normally operated NFP relay 816 in the engine control circuit which may be traced from ground over the normally closed contacts of the limit switch LI of the fuel pressure circuit, over conductor 911 and through the winding of relay 816 to battery whereupon relay 816 releases. The circiut of relay 816 is maintained opened at the contacts of limit switch LI as soon as the shaft 932 is rotated as will be described to simulate fuel pressure.

Relay 907 upon operating establishes a circuit from the grounded terminal of the secondary winding of power transmitter TRI, over the contacts of relay 907, through the rotor circuit of motor 930 and to the 25-volt tap of the secondary winding of transformer TRI. The stator winding of the motor is connected between the ground terminal and the 60-volt tap of the secondary winding. The primary winding of transformer TRI is energized over the supply line 206 from the 115-volt source 207. With the stator and rotor circuits of the motor 930 thus energized, the motor, through the reduction gear box 931, rotates the shaft 932 in a direction representative of an increase in fuel pressure, thus rotating the cams and the rotor of the synchro-transmitter 960 secured to such shaft.

The rotor winding of the transmitter 960 is energized from the 28-volt 400-cycle current source 601 connected to the bus bars 602 and 603 and as it is rotated produces a rotating field in the stator windings which are connected over conductors 603, 604 and 605 with the corresponding stator windings of the synchro-receivers 521 and 523 at the pilot's and instructor's instrument panels. The rotor winding of these receivers are also energized from the source 601 over the bus bars 602 and 603 so that the rotors accurately follow the movement of the rotor of the synchro-transmitter 960. The rotor shafts of the receivers 521 and 523 are connected to the fuel pressure gauges 520 and 522 so that these gauges show the fuel pressure simulated by the rotation of the shaft 932.

The shaft 932 continues to rotate under the control of relay 907 until, when the gauges 520 and 522 show a simulated fuel pressure of 16 pounds, the cam-operated set of springs 910 become opened thereby opening the previously traced circuit of relay 907 which thereupon releases and opens the rotor circuit of the motor 930 to stop the motor. The gauges now show the fuel pressure which would be obtained by the operation of the emergency booster pump.

Engine starts

When the pilot notes that fuel pressure is indicated by the fuel pressure indicator 520 he may start the engine by first operating the priming switch 540 followed by the operation of the engine starter switch 554. When the primer switch 540 is operated, a circuit is established from ground thereover, over conductor 555 and through the winding of priming (PR1) relay 813 to battery. Relay 813 thereupon operates and establishes a circuit from ground over its lower contacts and over conductor 814 through the Primer lamp at the instructor's desk to inform the instructor that the pilot has simulated the priming of the engine, and establishes a circuit for the slow releasing PR2 relay 815, which circuit may be traced from ground over the inner upper front contacts of the MB relay 800, over the back contact of the NFP relay 816, over the upper contacts of relay 813 and through the winding of relay 815 to battery. Relay 815 upon operating locks over its upper contacts, over the inner upper back contact of the engine start (EST) relay 817, over the back contact of relay 816 and to ground over the inner upper contacts of relay 809 and therefore remains operated after the priming switch 540 is restored and relay 813 has released.

When the starter switch 554 is operated, ground is connected over its contacts to conductor 556 thereby establishing the circuit of the Starter lamp at the instructor's desk to indicate to the instructor that the pilot has operated the starter switch, and establishing a circuit extending from conductor 556, over the contacts of the ST relay 802, through the winding of the ST relay 818 to battery. Relay 818, upon operating establishes a circuit from ground over the inner upper contacts of the MB relay 800, over the lower contacts of the cartridge (C) relay 806, over the inner upper contacts of relay 818 and through the winding of the ST1 relay 819 to battery. Relay 819, upon operating, locks independently of the continued operation of relay 818 over its inner upper contacts and the lower contacts of relay 806 to ground at the inner upper front contacts of relay 800 so that relay 819 remains operated after the pilot opens the starter switch 554.

At its lower contacts relay 819 establishes a circuit which extends from the bus bar $40\varphi1$, supplied with 40-volt 60-cycle current from the upper half of the divided secondary winding of transformer TR2 (the primary winding of which is energized from the source 207 over the bus bar 206), thence over the lower contacts of relay 819, over the upper back contact of relay 817, over conductor 820, through the winding of the throttle operated rheostat T4, over conductor 557, through resistances 208, 209 and 210 in series, over conductor 211 to the slider of potentiometer TAP8 driven by the motor of the true air speed motor unit, thence through the winding of such potentiometer, the leading 20 per cent of which is short-circuited, to the slider of the autotransformer TAVI driven by the motor of the true air speed motor unit and to ground. Since at this time the air speed of the simulated flight is zero the slider of the autotransformer is standing at the No. 2 or ground terminal of the autotransformer winding.

At the time the starting of the engine is simulated the throttle is assumed to be in its one-tenth open position or with the sliders of the throttle controlled rheostats slightly away from the No. 1 terminals of their windings. With the slider of rheostat T4 near the No. 1 terminal of its winding, most of the resistance of the rheostat winding is introduced into the previously traced circuit and a potential is derived at the slider of phase $\varphi 1$ which is connected over conductor 558 to the upper terminal of the primary winding of input transformer 212 of the No. 1 R. P. M. comparison circuit of Fig. 2. At this time potential of phase $\varphi 1$ is also applied from the slider of the propeller governor control rheostat P1, over conductor 559 to the lower terminal of the primary winding of input transformer T12. Potential of phase $\varphi 1$ is applied from the $40\varphi 1$ bus bar through resistance 560, through resistance 561 and the winding of rheostat P1 in parallel and through resistance 562 to ground. The propeller governor is at this time in its full propeller increase R. P. M. position or with the slider at the No. 1 terminal of the winding of the rheostat P1.

Under the condition just described, while potential of the same phase has been applied to both terminals of the primary winding of input transformer 212, such potentials will be of different value and as a consequence current will flow through such primary winding and a potential will be impressed upon the secondary winding of the transformer. This potential is impressed across the winding of rheostat 213 and the potential derived at its slider is impressed upon the control grid of the left unit of the dual triode tube 214. The tube 214 amplifies this potential and the amplified potential is applied upon the control grid of the gas-filled tube 215. The amplifier unit of tube 214 is supplied with plate potential from the +130-volt bus bar 201 and filament heating current is supplied to the filaments of both tubes 214 and 215 from the secondary winding of transformer 202, the primary winding of which is energized over the bus bar 206 from the source 207. Grid biasing potential is supplied to the control grid of tube 215 by the right unit of tube 214 which, with its control grid and plate connected together, functions as a diode rectifier. To secure the biasing potential, alternating current is impressed from the secondary winding of transformer 202 across the cathode-plate path through the right unit of tube 214, through the winding of bias adjusting rheostat 216 and through resistor 217. The rectified positive potential derived at the slider of rheostat 216 is applied through resistor 218 to the control grid of tube 215. Plate potential is supplied to the plate of tube 215 from the 115-volt bus bar 112, through the ballast lamp 219, the winding of plate relay 220 in parallel with resistance 221 and through the choke coil 222 to the plate. The amplified signal potential applied by the voltage amplifier unit of tube 214 upon the control grid of tube 215 will be opposite in phase to the plate potential applied to tube 215 and such tube will therefore not become conducting and plate relay 220 will not therefore operate. This condition will continue so long as the potential applied under the control at the governor rheostat P1 is greater than the potential applied under the control of the throttle rheostat T4.

Relay 220 being unoperated the potential applied to conductor 558 under the control of the throttle rheostat T4 is applied over the back contact of relay 220 through the primary winding of input transformer 223 of the No. 2 R. P. M. comparison circuit. Since no air speed has yet been simulated, the lower terminal of the primary winding of input transformer 223 will be at this time connected over conductor 224 to the slider of the true air speed potentiometer TAP4 which, with no air speed, is standing at the No. 1 or ground terminal of the potentiometer winding. The potential thus applied to the primary winding of input transformer 223 is entirely dependent upon the setting of the slider of the throttle rheostat T4. This potential is amplified by the left unit of tube 225 and the amplified potential is applied to the control grid of the gas-filled tube 226. The filaments of tubes 225 and 226 are heated by current supplied from the secondary winding of transformer 202, plate potential is supplied to the plate of the amplifier unit of tube 225 from the +130-volt bus bar 201, positive biasing potential is supplied to the tube 226 by the right unit of tube 225 functioning as a rectifier and plate potential is supplied to tube 226 from the bus bar 112 through the ballast lamp 227, through the winding of plate relay 228 in parallel with resistance 229 and through the choke coil 230.

In response to the input potential as amplified by the tube 225, tube 226 becomes conducting upon each positive half wave of the plate potential applied to its plate and an impulse of current is transmitted through the winding of plate relay 228 which thereupon becomes energized. Relay 228, upon operating, shunts resistance 231, over its lower contacts to increase the positive biasing potential applied to the control grid of tube 226 and over its upper front contact applies the potential applied to conductor 558 under the control of the throttle rheostat T4 over conductor 200, through resistance 125 to control conductor 137 of the R. P. M. motor control circuit of Fig. 1. The potential applied to conductor 137 is applied in parallel through resistance 126 and the winding of rheostat 127 to ground whereby a derived potential of phase $\varphi 1$ as determined by the setting of the slider of throttle rheostat T4 is impressed upon the control grid of the left unit of the dual amplifier tube 100.

*Operation of R. P. M. motor unit*

This potential is amplified by the two units of tube 100 connected in cascade and the amplified potential is impressed upon the primary winding of input transformer 102. Transformer 102 steps up this potential and applies it to the plates of the full wave rectifier tube 103 and to the control grid of the gas-filled motor reversing tube 105. The signal potential as rectified by the tube 103 is impressed upon the control grid of the gas-filled motor impulsing tube 104. As previously stated the tubes 104 and 105 are biased just below their critical breakdown or firing potential by positive biasing potential applied to their control grids under the control of the rectifier tube 108 and the bias adjusting rheostats 109 and 110. As the result of the application of the rectified signal potential applied to the control grid of tube 104, tube 104 will become conducting during each positive half wave of the plate potential applied from bus bar 112 through choke coil 135 to its plate and an impulse of positive current will flow from the bus bar 112, over the plate-cathode path through the tube 104 to the mid tap of the middle secondary winding of transformer 107, thence through the rotor circuit of motor 116, over the back contact of the LS relay 136 to ground. At the same time the potential applied to the control grid of tube 105 being of phase $\varphi 2$, which is opposite in phase to the plate potential applied to the plate of tube 105, tube 105 does not fire and the RV relay 115 consequently does not operate to cause the operation of the RV1 relay 119.

With relay 119 unoperated, the stator winding of motor 116 is energized over a circuit extending from the +130-volt bus bar 201, over conductor 117 through ballast lamp 118, over the inner upper back contact of relay 119, through the stator winding of motor 116, over the upper back contact of relay 119, over the normally closed contacts of the limit switch L2 and to ground. The motor thus has its stator winding energized in such a direction that in response to the current impulses transmitted through its rotor winding under the control of tube 104 as previously described, the motor rotates in such a direction that through the reduction gear box 130, shaft 122 and gears 123 and 124, the slider of the balancing potentiometer RP1 is driven from the No. 1 terminal toward the No. 3 terminal of its winding. Since this winding is energized by potential of phase $\varphi 2$ applied from the $40\varphi 2$ bus bar through its winding in parallel with resistance 128, the potential of phase $\varphi 2$ derived at the slider of such potentiometer is applied through resistance 129 and thence through resistance 126 in parallel with rheostat 127 to ground and potential of phase $\varphi 2$ is applied from the slider of rheostat 127 to the control grid of amplifier tube 100. As the slider of balancing potentiometer RP1 is moved towards the No. 3 terminal of its winding, the potential of phase $\varphi 2$ applied to the control grid of tube 100 increases until it balances the potential of phase $\varphi 1$ applied thereto over conductor 200, at which time tube 100 will receive no signal potential and the motor tube 104 will become extinguished to stop the transmission of driving impulses through the rotor circuit of motor 116 whereupon the motor 116 will come to rest.

The shaft 122 and the potentiometers RP3, RP4, RP8 and RP10, autotransformer RV7 and the rotor of the synchro-transmitter 121 driven by gearing from the shaft will now have been rotated into positions representative of a simulated engine speed of approximately 500 R. P. M. The rotor winding of the synchro-transmitter 121 and the rotor windings of the synchro-receivers 501 and 503 at the instructor's desk and at the pilot's instrument panel being energized by 400 cycle current applied thereto over the bus bars 602 and 603 and the stator windings of the transmitter and receivers being interconnected over bus bar 602 and conductors 130 and 131, the rotors of the synchro-receivers 501 and 503 will assume positions corresponding to the position into which the rotor of the synchro-transmitter 121 has been moved by the motor 116 of the R. P. M. motor control circuit and will move the pointers of the tachometers 500 and 502 to indicate the assumed engine speed of 500 R. P. M.

When the shaft 122 has been rotated to a position corresponding to a simulated engine speed of approximately 500 R. P. M., the cam V carried by the shaft 122 operates the contact springs operable thereby to connect alternating current from the bus bar 112, over such springs and through the winding of autotransformer RV7 to ground and a potential in accordance with the position of the slider of the autotransformer is applied over a circuit through inductance 132, through the stator winding and rotor of the vibrator motor VM and through inductance 133 to ground to cause the motor VM to run at a speed commensurate with the simulated engine speed of 500 R. P. M. and to increase its speed proportionally as the simulated engine speed increases. The shaft of the motor carries an eccentrically mounted weight and since the motor is attached to the mock-up of the fuselage of the airplane such mock-up is vibrated to simulate the vibration which would be caused by the operation of the engine and the propeller of an actual airplane.

As soon as the shaft 122 moves out of its normal position, the L1 limit switch moves to its alternate position removing ground from conductor 901 and thereby releasing the EN relay 900 in the fuel pressure circuit and connecting ground to conductor 134 to complete the circuit of the "on" relay 821 of the engine control circuit and to complete the circuit of the EST relay 205 of the R. P. M. control circuit of Fig. 2. When the shaft 122 moves to a position corresponding to a simulated engine speed of about 500 R. P. M., the contacts associated with the cam C, which cam is carried by the shaft 122, open thereby removing the locking circuit for the C relay 806 at the engine control circuit. Relay 806 thereupon releases in turn releasing the ST1 relay 819. With the starter switch still held closed in simulation of holding the ignition booster in the airplane, the ST2 relay 822 now operates in a circuit from ground over the inner upper front contacts of the MB relay 800, over the back contact of the NFP relay 816, over the lower contacts of the "on" relay 821, over the upper back contact of the ST1 relay 819, over the upper contacts of the ST relay 818 and through the winding of the ST2 relay 822 to battery. Relay 822 thereupon operates and locks over its upper contacts, over the lower contacts of relay 821 and thence as traced to ground at the contacts of relay 800.

A circuit is now established over which the EST relay 817 operates, which may be traced from battery through the winding of such relay over the lower contacts of the PR2 relay 815, over the lower contacts of the ST2 relay 822, over the upper back contacts of the LM and RM relays 809 and 810 and over conductor 823 to ground over the normally closed contacts of the "engine disable" key at the instructor's desk. Relay 817 upon operating closes a circuit over its middle upper front contacts for the ES relay of the sound effects circuit represented by the dotted square 824 and fully disclosed in the application of R. H. Gumley Serial No. 622,065, filed concurrently herewith, and abandoned November 4, 1949, to simulate the noise incident to the operation of the engine. At its upper front contact, relay 817 maintains the R. P. M. motor control circuit under the control of the throttle operated rheostat T4 by connecting potential of phase $\varphi 1$ from the $40\varphi 1$ bus bar over the lower back contacts of relays 809 and 810, through resistance 825, over the upper front contact of relay 817 and over conductor 820 to the winding of throttle rheostat T4.

Simulation of oil pressure

Relay 817 at its inner lower back contact opens the circuit extending from ground thereover, over conductor 826 and through the winding of the not firing (NF) relay 606 of the oil pressure circuit of Fig. 6 which thereupon releases. Since the EN relay 900 has already released a circuit is established for the increase pressure (I) relay 607 of the oil pressure circuit, which may be traced from battery through the winding of such relay over the lower contacts of the D. C. relay 608 (which until the limit switch L1 operated by shaft 609 leaves its normal position or zero pounds pressure position is held operated), over the normally closed contacts of the spring assembly operable by the 120—200 cam mounted on shaft 609, over conductor 610 over the normally closed contacts of the switch 946 operable by cam 0—37 mounted on shaft 912 of the cylinder and oil temperature motor unit (Fig. 9), to ground at the upper back contact of relay 900.

Relay 607, upon operating, establishes a holding circuit for relay 608 extending over the upper front contact of relay 608, over the lower contacts of relay 607 and to ground at the upper back contact of the DD relay 611, and establishes the rotor circuit for motor 612. This circuit extends from the ground terminal of the secondary winding of transformer TR1 over conductor 913, over the upper front contacts of relay 607, through the rotor circuit of the motor and over conductor 914 to the 25-volt tap of the secondary winding of transformer TR1. Since the stator winding of the motor 612 is connected between the ground terminal and the 60-volt terminal of the secondary winding of transformer TR1 over conductors 913 and 915, the motor rotates and through the reduction gear box 613 drives the shaft 609 in a direction simulating an increase in oil pressure. As soon as the shaft 609 moves, the limit switch L1 is operated to open the normally closed operating circuit for relay 608 but this relay is now maintained operated under the control of the I relay 607. As soon as the shaft 609 has been rotated to a position corresponding to a simulated oil pressure of 120 pounds, the contacts associated with cam 120—200 open thereby releasing relay 607. Relay 607, upon releasing, opens the rotor circuit of motor 612 to stop the motor and opens the locking circuit of relay 608 which then releases.

The rotation of shaft 609 has rotated the rotor of the synchro-transmitter 614, the winding of which together with the rotor windings of the synchro-receivers 531 and 533 at the instructor's desk and pilot's instrument panel are energized by 28-volt 400-cycle current over the bus bars 602 and 603. Since the stator windings of the transmitter 614 and receivers 531 and 533 are interconnected over the bus bar 603 and conductors 615 and 616, the rotors of the receivers follow the movement of the rotor of the transmitter 614 and the oil pressure gauges 530 and 532 driven by the rotors of receivers 531 and 533 are therefore operated to indicate an oil pressure of approximately 120 pounds.

Simulation of cylinder and oil temperatures

It will be assumed that the cylinder temperature indicators 617 and 618 at the instructor's desk and on the pilot's instrument panel and the oil temperature indicators 619 and 620 at the instructor's desk and on the pilot's instrument panel, under normal conditions and before the engine is started, all indicate a temperature of 15° C. It will also be assumed that the pilot has operated the cowl flaps handle to its open position thereby closing the cam operated contacts 564 to establish a circuit from ground thereover, over conductor 565 and over the upper back contact of the CO relay 621, over the contacts of the L2 limit switch of the cowl flaps motor circuit and through the winding of the O relay 622 to battery. The movement of the handle to the open position is indicated at the instructor's desk by a lamp (not shown). Relay 622 thereupon operates and short-circuits the right shaded pole winding of motor 600 and, with the stator winding of the motor energized by current from the bus bar 203, the motor 600 through the reduction gear box 624 rotates the shaft 623 in such a direction as to move the slider of the potentiometer CFP1 to the No. 3 terminal of its winding at which time the cam of the limit switch L2 will open the circuit of relay 622 to stop the motor.

The winding of the potentiometer CFP1 is energized in a circuit extending from ground in parallel through the winding and resistance 625, through resistance 626, over conductor 627, over the lower front contact of the 0—65 relay at the true air speed motor unit, which relay is operated over the normally closed contacts of the 0—65 switch 301 until the air speed exceeds 65 knots, through resistance 302 and to the 40φ2 bus bar. With the winding of potentiometer CFP1 thus energized, potential of phase φ2 derived at its slider is connected through resistance 628 to control conductor 916 of the cylinder and oil temperature motor control circuit of Fig. 9.

Figure 4:
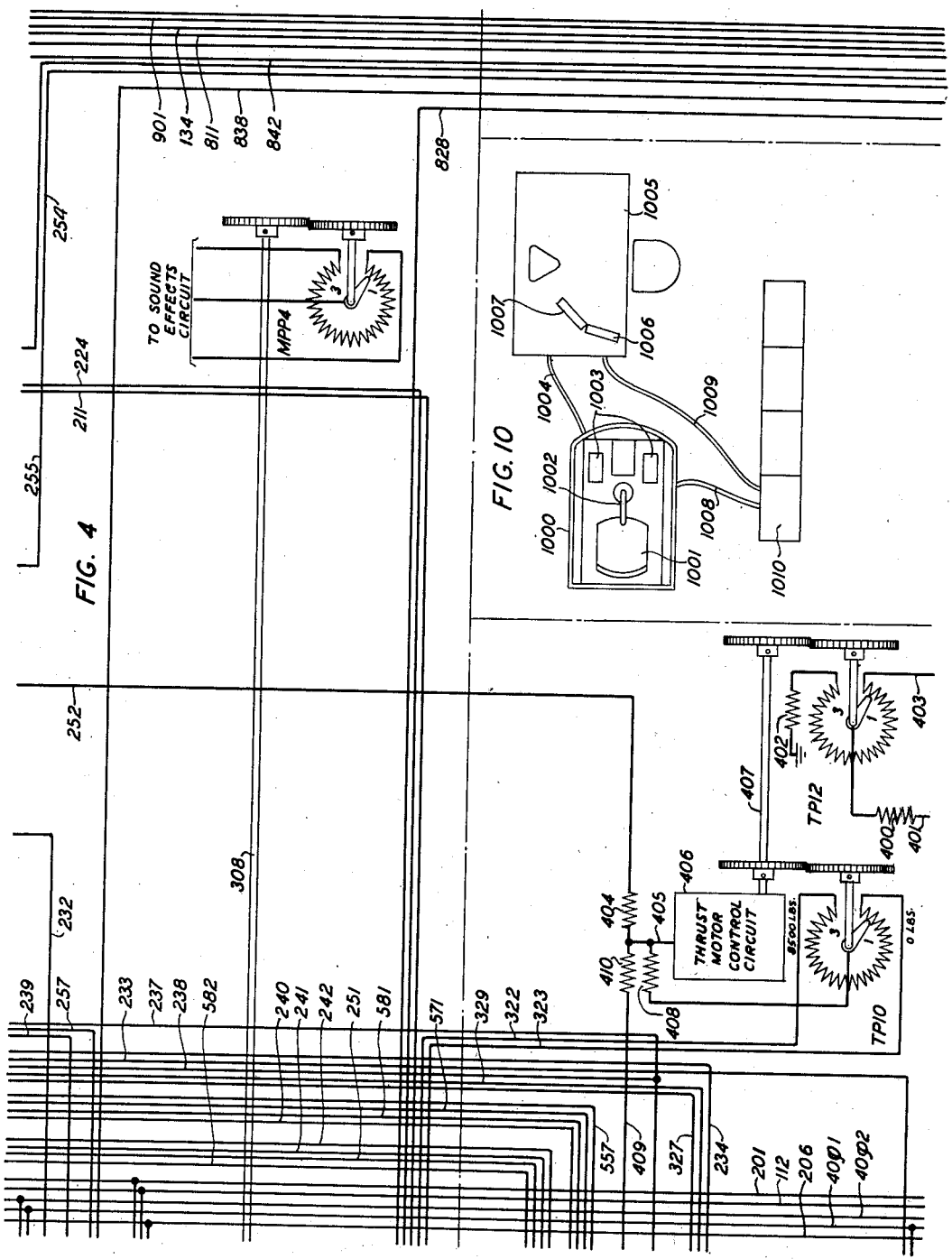
Fig. 4 shows in the upper portion thereof an additional potentiometer driven by the manifold pressure motor control circuit of Fig. 3 and in the lower portion thereof a schematic disclosure of the thrust motor control circuit and certain of the potentiometers driven thereby.

Upon the operation of the EST relay 817 of the engine control circuit, potential of phase φ1 is connected from the slider of the thrust potentiometer TP12, Fig. 4, through resistance 400 and over conductor 401 to the control conductor 916. To derive this potential the winding of potentiometer TP12 is energized over a circuit extending from ground, through resistance 402, over conductor 403, over the middle lower front contact of relay 817, over the lower back contact of the rich mixture (R) relay 827, over conductor 828, over the upper front contact of relay 300, through resistance 303 to the 40φ1 bus bar. It is to be noted that this control or signal potential is not applied to the control conductor 916 of the cylinder and oil temperature motor control circuit until the engine starts, and is increased by the movement of the slider of the thrust potentiometer TP12 in accordance with the thrust developed by the propeller or indirectly in accordance with the power developed by the engine. The instructor may, by the manual movement of the slider of rheostat 629, apply no potential or a predominant potential of either phase φ1 or φ2 through resistance 630 to control conductor 916 to cause no change in the indicated cylinder and oil temperature or to cause an increase or a decrease in the indicated temperatures. For this purpose the winding of rheostat 629 is shunted by resistance 631 and the opposite ends of the winding are connected through resistances 632 and 633 with the 40φ1 and 40φ2 bus bars.

With the cowl flaps open, tending to slow down the heating up of the engine, the slider of rheostat 629 is set to cause a normal temperature indication of 15° C. and the thrust potentiometer TP12 adjusted to a position indicating the thrust developed at the assumed speed of 500 R. P. M., the summation of the phase φ1 and φ2 potentials applied to control conductor 916 will be a potential of phase φ1 which will be applied across the rheostat 917. The φ1 potential derived at the slider of rheostat 917 is applied to the control grid of the left unit of the dual voltage amplifier tube 918, is amplified by the cascaded units of this tube and is applied to the primary winding of the step-up input transformer 919. The potential impressed upon the upper secondary winding of the transformer is applied through the control grid of the motor reversing tube 920 and the potential impressed upon the divided lower secondary winding of the transformer is rectified by the full wave diode rectifier tube 921 and impressed upon the control grid of the motor impulsing tube 922.

Plate potential is supplied to the voltage amplifier tube 918 from the +130-volt bus bar 201, filament heating current is supplied to the tubes 918, 919, 921, 922 and 923 from the secondary winding of transformer 924, the primary winding of which is energized from the bus bar 206, and grid biasing potentials derived from the secondary winding of transformer 924, rectified by the dual diode tube 923 and regulated by the rheostats 925 and 926, are applied to the control grids of the tubes 920 and 922. Plate potential is supplied to the tube 920 from the bus bar 112, through ballast lamp 927, through the R2 relay 926 and resistance 929 in parallel and through choke coil 933, and to the plate of tube 922, through ballast lamp 927, through the R1 relay 934 and resistance 935 in parallel and through choke coil 936.

With rectified signal potential applied to the control grid of tube 922, such tube fires upon each positive half wave of the potential applied to its plate and transmits an impulse of current through the winding of relay 934. Due to the action of choke coil 936, relay 934 remains steadily energized so long as signal potential appears on the input control grid of tube 922. At the same time the signal potential of phase φ1 causes potential of phase φ2 to appear on the control grid of tube 920 which potential is opposite in phase to the plate potential of such tube and consequently tube 920 does not fire to operate relay 928.

With relay 934 operated and relay 938 not operated, a shunt is closed from the grounded middle tap of the shaded pole winding of the motor 950, through the left shaded pole winding, over the closed contacts of the L2 limit switch, over the upper back contact of relay 928 and the upper contacts of relay 934 to ground. The motor 950 through the reduction gear box 951 now rotates the shaft 912 in a direction to advance the sliders of the potentiometers Bal, Cyl and Oil toward the No. 3 terminals of their windings. As the slider of the balancing potentiometer Bal advances, potential of phase φ2 in increasing value is applied through resistance 948 to control conductor 916 until, when such potential balances the signal potential of phase φ1 applied to such conductor, no potential appears on the control grid of the left unit of amplifier tube 918 and as a consequence no signal potential is applied to the grid of tube 922 and such tube ceases to fire and transmit impulses through the winding of relay 934. Relay 934 thereupon releases and the motor 950 comes to rest. For deriving the potential of phase φ2, at the slider of potentiometer Bal, the potentiometer winding is energized over a circuit extending from the 40φ2 bus bar through resistance 937 and through the potentiometer winding in parallel with resistance 938 to ground.

In response to the adjustment of the slider of the potentiometer Cyl, the winding of which is energized by direct current, a circuit is established from battery, over the upper portion of the potentiometer winding, through resistance 939, over conductor 940 and through the cylinder temperature indicators 617 and 618 at the instructor's desk and on the pilot's instrument panel and thence to ground. Also in response to the adjustment of the slider of the potentiometer Oil, direct current is applied from such slider, through resistance 941, over conductor 942 and in series through the oil temperature indicators 619 and 620 at the instructor's desk and on the pilot's instrument panel and thence to ground. The winding of potentiometer Oil is energized over a circuit from battery, over the lower contacts of the MB relay 800, over the lower contacts of the INS circuit breaker relay 805, over conductor 829, through resistance 943, through the winding of potentiometer Oil, through resistance 944, over conductor 945 and through the rheostat 634 at the instructor's desk to ground. Under the conditions assumed, the cylinder temperature indicators 617 and 618 will slowly increase their readings from 15° C. to readings somewhat less than 150° C. after an interval of about 2 minutes and the oil temperature indicators 619 and 620 will slowly increase their readings from 15° C. to readings somewhat less than 40° C. after an elapse of about 2 minutes.

*Decrease of oil pressure as oil temperature increases*

As the shaft 912 rotates to a position representing an increase of oil temperature above 37° C., the 0—37 cam moves the spring assembly 946 associated therewith to its alternate position and, with the EN relay 900 now released, establishes a circuit from ground over the upper back contact of relay 900, over the alternate contacts of spring assembly 946, over conductor 947, over the alternate contacts of the spring assembly previously operated by the 0—90 cam of the oil pressure circuit, over the back contact of the NF relay 606 and through the winding of the DD relay 611 to battery. Relay 611 thereupon operates and establishes a circuit through the rotor of motor 612 of the oil pressure circuit which extends from the 25-volt tap of the secondary winding of transformer winding TR1, over conductor 914, through the rotor of the motor, over the upper back contacts of the I relay 607, of the D relay 635 and of the ID relay 636, over the lower contacts of relay 611, and over conductor 637 to the 35-volt tap of the secondary winding of transformer TR1. The stator winding of the motor 612 being energized as previously described, the motor now runs in such a direction as to rotate the shaft 609 in a direction representative of a reduction of oil pressure. After about 2 minutes the shaft 609 will have rotated to a position in which the cam 0—90 will have released the spring assembly associated therewith to the position illustrated in which the circuit of relay 611 is opened to stop the motor. At this time through the control of the synchro-transmitter 614 the oil pressure gauges 530 and 532 will show a reduction in oil pressure to approximately 90 pounds. This action simulates the reduction of the oil pressure of an engine incident to the heating of the oil and the reduction of its viscosity.

As a further result of the operation of the EST relay 817 of the engine control circuit, the previously traced locking circuit of the PR2 relay 815 is opened at the inner upper back contact of relay 817 and relay 815 releases. Relay 815 is slow to release thus allowing an appreciable spurt of engine noise before it becomes sufficiently released to open the circuit of the EST relay 817 and thus cause the release of relay 817 if the pilot does not move the mixture control MC. In normal starting the pilot will move the mixture control MC out of its ICO position into the Auto Rich position as soon as the engine noise and tachometer indicate that the engine has started. When the control is moved from the ICO position, the ICO relay 808 releases thereby extinguishing the ICO lamp at the instructor's desk and providing over its lower back contact an alternative path for holding the EST relay 817 operated after relay 815 releases.

*Operation of mixture control*

When the mixture control reaches its Auto Rich position a circuit is established from ground over its lowermost normal contacts, over its middle alternate contacts, over conductor 566 and through the winding of the R relay 827 to battery. Relay 827 therefore operates and establishes a circuit from ground over its upper contacts, over the upper back contact of the FR relay 830 and over conductor 831 through the Auto Rich lamp on the instructor's desk to battery, to inform the instructor that the pilot has operated the mixture control to the Auto Rich position. As a further result of the operation of relay 827, resistance 832 is interpolated into the circuit from conductor 828, over the lower back contact of relay 830, over the inner lower front contact of relay 827, over the middle lower front contact of relay 817 and conductor 403 to the winding of the thrust potentiometer TP12 whereby the potential applied from the slider of such potentiometer over conductor 401 to the control conductor 916 of the cylinder and oil temperature motor control circuit is reduced so that the indicated cylinder and oil temperatures will be decreased. A further result of the operation of relay 827 will be to increase the simulated thrust developed by the engine driven propeller as will later be described.

If the mixture control MC is moved further into the Full Rich position, relay 827 remains operated but in addition the circuit of the FR relay 830 is established from ground over the lower normal contacts and upper alternate contacts of switch MC and over conductor 567 through the winding of relay 830 to battery. With relays 827 and 830 both operated, the Auto Rich lamp at the instructor's desk becomes extinguished and the circuit of the Full Rich lamp is established from ground over the upper front contacts of relays 827 and 830, over conductor 833 and through the lamp to battery indicative of the fact that the mixture control switch has been operated to the Full Rich position. With relays 827 and 830 both operated, resistances 832 and 834 are both interpolated into the energizing circuit of the thrust potentiometer TP12 resulting in a further decrease of engine cylinder and oil temperatures.

When the EN relay 900 of the fuel pressure circuit releases, as previously described, upon the starting of the engine with the BP relay 903 still operated, the circuit of the I relay 907 is reestablished over a circuit from ground, over the inner upper back contact of relay 900, over the lower contacts of relay 906, over the spring contacts 952 controlled by cam 17—25 carried by shaft 932, over the inner upper front contact of relay 903, over the back contact of relay 908 and through the winding of relay 907 to battery. As previously described, relay 907 upon operating causes the motor 930 to rotate the shaft 932 in a direction indicative of an increase in fuel pressure until the cam 17—25 opens the circuit of relay 907 at the contacts of springs 952 to arrest the operation of the motor. The rotation of the shaft 932 will now have rotated the rotor of synchro-transmitter 960 to such a position as to have caused the fuel pressure gauges 520 to 522 on the pilot's and instructor's instrument panels to indicate a fuel pressure of 17 pounds per square inch. This simulates the fuel pressure secured in an actual airplane due to the combined pressures produced by the booster pump and the engine driven pump.

*Manifold pressure indication*

Figure 3:
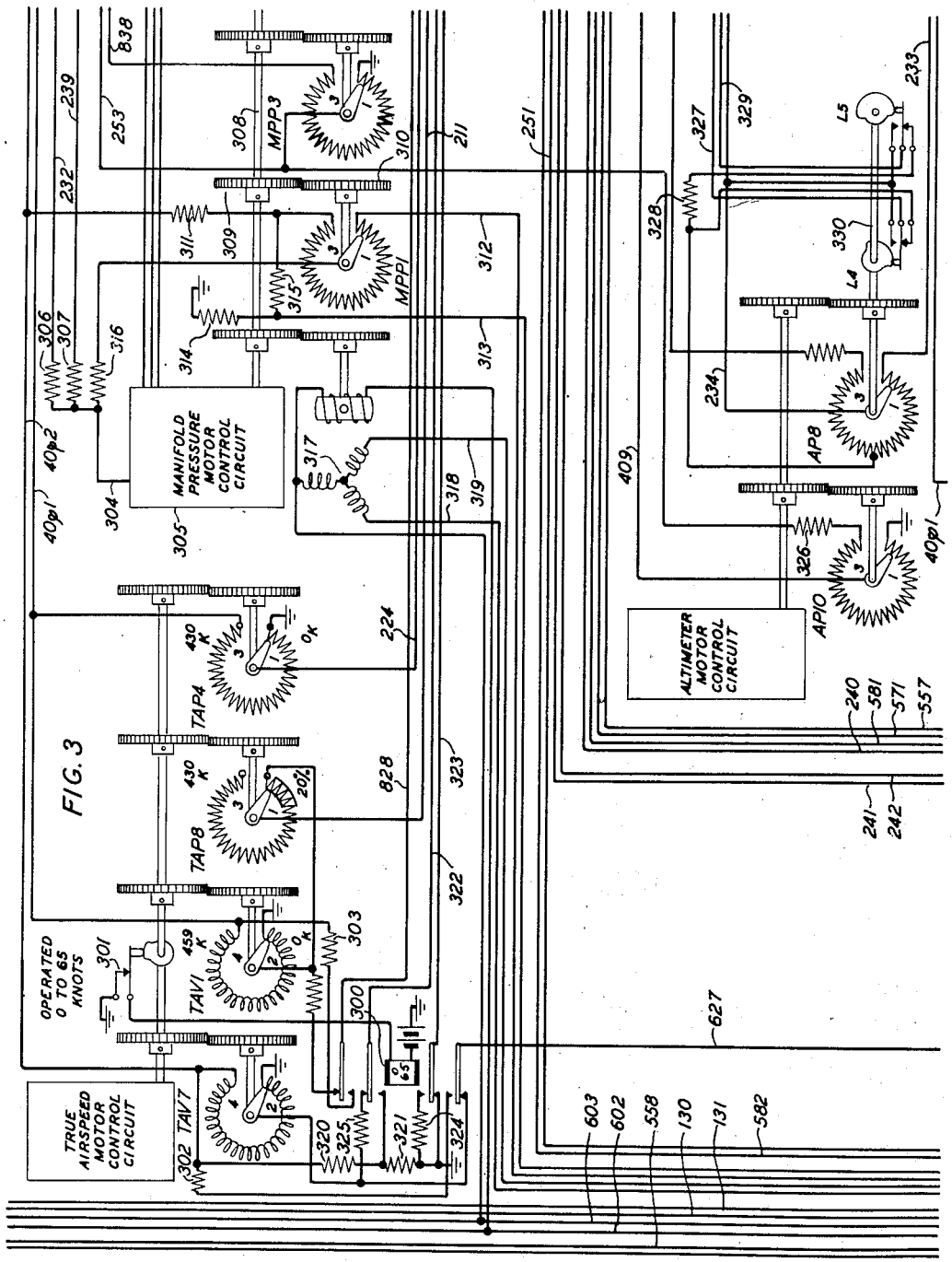

The position that the manifold pressure motor unit, schematically disclosed in Fig. 3, assumes, determines the manifold pressure indicated by the indicators 510 and 512 on the pilot's and instructor's instrument panels and is a function of the engine R. P. M., throttle setting, supercharger control position and the altitude of the assumed flight.

With the trainer normal and assumed to be at sea level and before the engine is started the EST relays 817 and 205 in the engine control circuit and R. P. M. motor control unit are both operated and a signal potential representing atmospheric pressure is applied to the control conductor 304 of the manifold pressure motor control circuit represented by the box 305 of Fig. 3. This control circuit as previously stated is in most respects similar to the R. P. M. motor control circuit disclosed in Fig. 1. At this time ground potential is applied through the R. P. M. potentiometer RP4 over conductor 232 and through resistance 306 to control conductor 304. With relay 205 unoperated a circuit is established over the potential divider extending from the $40\varphi1$ bus bar, over the middle upper back contact of the EST relay 205, over conductor 233 to the No. 1 terminal of the winding of altimeter potentiometer AP8, the slider of which potentiometer will be at the No. 1 terminal of its winding since the altitude at this time is zero or sea level, over the slider of such potentiometer, over conductor 234, over the inner lower back contact of relay 205, through resistance 235, through resistance 236, over conductors 237 and 238 and over the upper back contact of relay 205 to ground. Potential of phase $\varphi1$ from this divider, which is representative of the atmospheric pressure at sea level, is applied from the junction point between resistances 235 and 236, over the middle lower back contact of relay 205, over conductor 239 and through resistance 307 to control conductor 304 of the manifold pressure motor control circuit.

This signal potential causes the motor control circuit 305 to drive the motor associated therewith in such a direction that through the shaft 308 and gears 309 and 310, the slider of the balancing potentiometer MPP1 is driven toward the No. 3 terminal of its winding. The winding of this potentiometer is energized by potential of phase $\varphi2$ applied thereto from the $40\varphi2$ bus bar, through resistance 311, through the potentiometer winding, over conductor 312, through the manifold pressure rheostat 568 at the instructor's desk, over conductor 313 and through resistance 314 to ground. The series connected potentiometer and rheostat windings are shunted by resistance 315.

The potential of phase φ2 derived at the slider of potentiometer MPP1 is applied through resistance 316 to control conductor 304 and when through the movement of the slider of this potentiometer, this potential of phase φ2 balances the potential of phase φ1 applied through resistance 307, the rotation of the motor of the manifold pressure unit will cease.

At this time the sliders of potentiometers MPP3 and MPP4 will have been set through the rotation of shaft 308 and the rotation of the associated driving gears into positions representing the atmospheric pressure at sea level and the rotor of the synchro-transmitter 317 will have been rotated to a position representing the atmospheric pressure at sea level. The rotor winding of this transmitter is energized over the bus bars 602 and 603 from the 28-volt 400-cycle source 601 and the stator windings are connected over the bus bar 602 and conductors 318 and 319 with the corresponding stator windings of the synchro-receivers 511 and 513 at the pilot's and instructor's instrument panels. With the rotor windings of the receivers also energized from the source 601 over the bus bars 602 and 603, the rotors of the receivers will follow the movement of the rotor of the transmitter 317 and will position the indicators 510 and 512 to indicate the atmospheric pressure at sea level or pressure readings of 30 inches of mercury.

Figure 2:
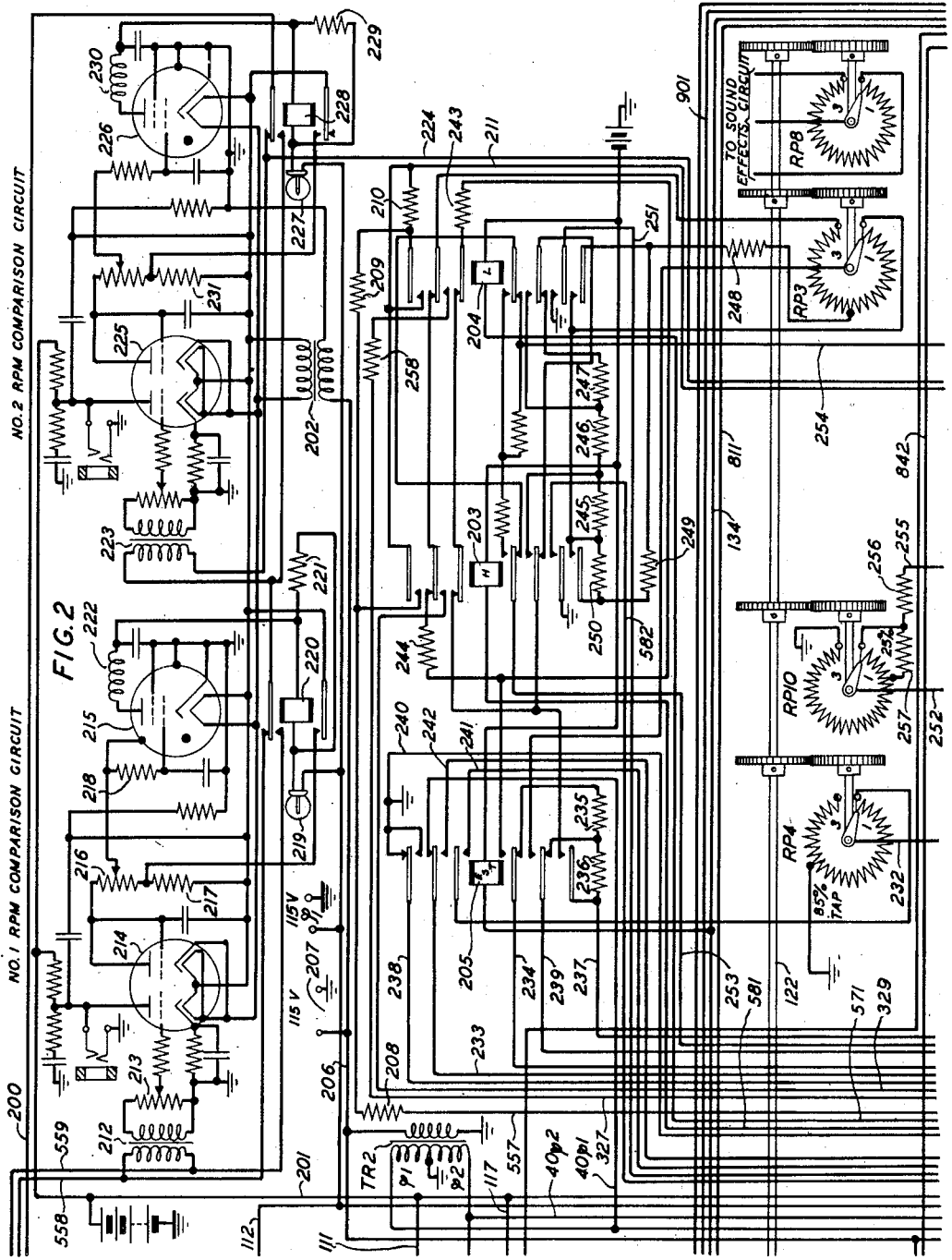

When the EST relay 205 of Figure 2 operates, when the engine is started, the manifold pressure motor unit will take a new setting dependent upon the setting of the throttle, the altitude at which the flight is assumed to be made, the high or low speed operation of the supercharger, the R. P. M. of the engine and the setting of the manifold pressure control at the instructor's desk. A first potential of phase φ1 is applied to control conductor 304 of the manifold pressure motor control circuit through resistance 306 under the control of the throttle rheostat T3. For this purpose the winding of rheostat T3 is energized in the circuit from the 40φ1 bus bar, through resistance 569 and through such rheostat winding to ground on conductor 240 and the potential derived at the slider of the rheostat is applied over conductor 241, over the inner upper front contact of relay 205 and through the first 85 per cent of the winding of the R. P. M. potentiometer RP4 to ground, whereby the winding of potentiometer RP4 is energized in accordance with the setting of the slider of throttle rheostat T3. Such energization decreases as the throttle is opened. The potential derived at the slider of potentiometer RP4, which also decreases as the R. P. M. of the engine increases until it becomes zero as the R. P. M. increases above 2300 R. P. M., is applied over conductor 232 and through resistance 306 to control conductor 304.

At the same time potential of phase φ1 applied from the 40φ1 bus bar through the winding of throttle rheostat T2 to ground on conductor 240, is derived at the slider of such potentiometer and applied over conductor 242, over the middle upper front contact of relay 205, over conductor 233, over the slider of altimeter potentiometer AP8 set at the No. 1 terminal of its winding since no flight take off has yet been made, over conductor 234, over the inner lower front contact of relay 205, through resistance 243, over the inner upper back contacts of relays 204 and 203, over the lower front contact of relay 205, over conductors 237 and 238 and over the upper front contact of relay 205 to ground. Between the slider of rheostat T2 and resistance 243 or at the inner lower front contact of relay 205, potential is applied through resistance 244, over the middle upper back contacts of relays 203 and 204, through the winding of the R. P. M. potentiometer RP3, through resistances 245, 246 and 247 in series, over the lower back contact of relay 204, over the lower back contact of relay 203, over the lower back contact of relay 205, over conductors 237 and 238 and over the upper front contact of relay 205 to ground. With relays 203 and 204 both deenergized, the lower or leading 50 per cent of the winding of potentiometer RP3 is shunted by the serially connected resistances 248, 249 and 250 and therefore the potential of phase φ1 derived at the slider of potentiometer RP3 will vary at one rate until the assumed engine speed reaches approximately 1600 R. P. M. and will vary at a different rate when the R. P. M. becomes greater than 1600. This potential which increases as the throttle opens and increases as the R. P. M. of the engine increases is then applied from the slider of potentiometer RP3, over the middle lower front contact of relay 205, over conductor 239 and through resistance 307 to control conductor 304 of the manifold pressure motor control circuit 305.

Thus two potentials of phase φ1 are applied to control conductor 304 under the control of throttle rheostats T2 and T3 and under the control of the R. P. M. potentiometers RP3 and RP4. The summation of these potentials with the throttle only about 10 per cent open and the engine idling will be less than the potential applied to conductor 304 before the starting of the engine was simulated, so that now the balancing potential of phase φ2 previously applied to conductor 304 by the balancing potentiometer MPP1, will be greater than the summation of the φ1 potentials and as a consequence, the motor of the manifold pressure motor circuit will be operated in the reverse direction to return the slider of potentiometer MPP1 toward the No. 1 terminal of its winding until the potential of phase φ2 applied from the slider of such potentiometer to conductor 304 again balances the φ1 signal potentials. The sliders of potentiometers MPP3 and MPP4 will be similarly adjusted and the synchro-transmitter 317 will control the synchro-receivers 511 and 513 to reset the manifold pressure indicators 510 and 512 until they read about 21 inches of mercury.

The pilot now advances the throttle until the tachometers 500 and 502 show an assumed engine speed of 1000 R. P. M. The opening of the throttle causes the movement of the slider of rheostat T4 to increase the potential of phase φ1 applied over conductor 558 to control conductor 200 of the R. P. M. motor control circuit as previously described and the control circuit then functions to rotate the shaft 122 to a position representative of the engine speed of 1000 R. P. M.

With the opening of the throttle and the increase of the engine speed to 1000 R. P. M. the potential of phase φ1 applied from the slider of the potentiometer RP3 to control conductor 304 will increase and the potential of phase φ1 applied from the slider of the potentiometer RP4 to conductor 304 will decrease and the summation of such potentials will be less than the summation potential applied to conductor 304 before the engine speed was increased to 1000 R. P. M. and as a consequence the manifold pressure motor control circuit 305 causes the readings of the manifold pressure indicators 510 and 512 to show a slight decline in pressure below 21 inches of mercury.

At the engine speed of 1000 R. P. M. the cylinder temperature indicators 617 and 618 will show cylinder temperature of 150° C., and oil temperature indicators 619 and 620 will show an oil temperature of 40° C., the oil pressure gauges 530 and 532 will show an oil pressure of 90 pounds per square inch and the fuel pressure gauges 520 and 521 will show a fuel pressure of 17 pounds per square inch.

*Magneto check*

Before simulating a take-off, the two magnetos should be checked to determine if they are both functioning. The pilot first applies the brakes (not shown) and holds the stick (not shown) full back and then advances the throttle until the tachometers 500 and 502 read 2000 R. P. M. In response to the advance of the throttle the slider of throttle rheostat T4 is moved further toward the No. 3 terminal of its winding thereby increasing the potential of phase $\varphi 1$ applied as previously described to control conductor 137 of the R. P. M. motor control circuit and such circuit then functions as previously described to operate motor 116 until the slider of balancing potentiometer RP1 has applied a balancing potential of phase $\varphi 2$ to conductor 137 which balances the throttle control potential of phase $\varphi 1$. At this time the shaft 122 will have been set into a position representative of an engine speed of 2000 R. P. M. and the tachometers 500 and 502 will read 2000 R. P. M.

As a result of the advance of the sliders of throttle rheostats T2 and T3 and the new settings of the sliders of the R. P. M. potentiometers RP3 and RP4 for an engine speed of 2000 R. P. M., the summation of the phase $\varphi 1$ potentials applied to control conductor 304 of the manifold pressure motor control circuit 305 first decreases at one rate until an engine speed of about 1100 R. P. M. is reached and then increases at an increasing rate as determined by the shunted center tapped potentiometer RP3. As a result of the decrease of potential applied to control conductor 304 until the engine speed exceeds 1100 R. P. M. the manifold pressure motor control circuit functions in the manner previously described to cause the shaft 308 to be rotated in a direction representative of a decrease in manifold pressure thereby causing the manifold pressure indicators 510 and 512 to decrease their readings to show a manifold pressure of about 20 inches of mercury. Thereafter as the throttle is opened and the engine speed increases to 2000 R. P. M. and the summation potential increases the manifold pressure motor control circuit functions to cause the readings of the indicators to increase to show a manifold pressure of 27 inches of mercury. This lowering and then increasing the manifold pressure as the throttle is opened closely simulates the actual performance of an airplane engine.

The pilot now turns the ignition key, Fig. 5, to the L position in which ground is connected to conductor 551 and ground is disconnected from conductor 550. With ground connected to conductor 551, the RM relay 810 operates simulating the disconnection of the right magneto, so that the engine will be fired only by the left magneto. With relay 810 operated the 22-ohm resistance 836 is inserted into the circuit over which potential of phase $\varphi 1$ is applied to the winding of throttle rheostat T4 thereby reducing the potential of phase $\varphi 1$ applied as previously described to control conductor 137 of the R. P. M. motor control circuit. The potential of phase $\varphi 2$ applied to the input of the R. P. M. control circuit by the balancing potentiometer RP1 will now be greater than the reduced throttle potential of phase $\varphi 1$ and the motor 116 will therefore be operated in such a direction as to return the slider of balancing potentiometer RP1 toward the No. 1 terminal of its winding until the phase $\varphi 2$ potential becomes equal to the phase $\varphi 1$ potential. As a result of the operation of the motor driven shaft 122, the synchro-transmitter 121 will be adjusted to cause the tachometers 500 and 502 to show a reduction engine speed to 1950 R. P. M. This simulates the reduction in engine speed resulting from the operation on the left magneto only.

When the ignition key is returned to its Both position, relay 810 releases again shunting resistance 836 and the indicated engine speed then again increases to 2000 R. P. M. The pilot then turns the ignition key to the R position in which position ground is connected to conductor 550 and ground is removed from conductor 551. Consequently relay 809 operates and removes the shunt from the 32-ohm resistance 837 whereby such resistance is inserted in the circuit over which potential of phase $\varphi 1$ is applied through the winding of throttle rheostat T4 thereby reducing the potential of phase $\varphi 1$ applied to control conductor 137 of the R. P. M. motor control circuit. The motor control circuit now functions to control the motor 116 to set the shaft 122 into a position representative of an engine speed of 1925 R. P. M. which is indicated by the resetting of the tachometers 500 and 502. This simulates the reduction of engine speed to 1925 R. P. M. incident to the operation of the engine on the right magneto only. When the ignition key is restored to the "Both" position, relay 809 releases again shunting resistance 837 and the indicated engine speed then increases to 2000 R. P. M.

*Engine simulation under take-off conditions*

To simulate take-off the pilot releases the brake, allows the stick to return to its normal position and advances the throttle gradually to the full throttle position. As a result of the advancing of the throttle, the slider of throttle rheostat T4 moves toward the No. 3 terminal of its winding thereby increasing the potential of phase $\varphi 1$ applied as previously described under the control of the R. P. M. comparison circuit of Fig. 2 to the control conductor 137 of the R. P. M. motor control circuit. This motor control circuit now controls the motor 116 to rotate the shaft 122 into a position representative of the increase of engine speed to 2700 R. P. M. as indicated by the tachometers 500 and 502.

Should the throttle be opened to such an extent as to tend to cause the engine speed to rise about 2700 R. P. M. as determined by the setting of the propeller governor control, the No. 1 R. P. M. propeller circuit will function to prevent the simulated engine speed from exceeding 2700 R. P. M. This simulates the adjustment of the pitch of the propeller blade under the control of the propeller governor to automatically maintain the engine speed at the R. P. M. determined by the setting of the propeller governor control. This is accomplished by the No. 1 R. P. M. comparison circuit in the following manner.

Until the potential of phase $\varphi 1$ applied over conductor 558 to the input of the No. 1 R. P. M. comparison circuit under the control of the throttle rheostat T4, exceeds the potential of phase $\varphi 1$ applied over conductor 559 to the input of the comparison circuit under the control of the propeller governor rheostat P1, the potential determined by the setting of the throttle rheostat T4 remains effective to determine the position into which the shaft 122 of the R. P. M. motor control unit will be set representative of the engine speed. However, should the throttle rheostat be adjusted into a position which would call for the setting of the shaft 122 into a position representative of a higher engine speed than that called for by the setting of the propeller governor rheostat P1, in the case assumed 2700 R. P. M., then the potential of phase $\varphi 1$ applied to the input of the No. 1 comparison circuit under the control of the throttle rheostat T4 will exceed the potential of phase $\varphi 1$ applied to such input under the control of the propeller governor rheostat P1 and as a consequence the potential impressed upon the control grid of the left unit of amplifier tube 214, as amplified by such unit and as impressed upon the control grid of the tube 215 will be in phase with the plate potential applied to the plate of tube 215 and tube 215 will therefore fire upon each positive half cycle of its plate potential to transmit an impulse of current from bus bar 112, through ballast lamp 219, through the winding of relay 220 and resistance 221 in parallel, through choke coil 222 and over the plate-cathode path through tube 215 to ground.

Relay 220 therefore becomes energized by such impulses, smoothed by the action of choke coil 222. At its lower contacts it shunts resistance 217 to insure that the tube 215 will continue to fire so long as the signal potential is present on its control grid, at its upper back contact opens the circuit over which the throttle controlled potential has been applied to the control conductor 137 of the R. P. M. motor control circuit and at its upper front contact connects conductor 559 to the control conductor 137 so that now the signal potential of phase $\varphi 1$ applied to the control conductor 137 is determined by the setting of the propeller governor rheostat P1 rather than by the throttle rheostat T4. The shaft 122 of the R. P. M. motor control unit cannot now assume a position representative of an engine speed greater than that determined by the setting of the propeller governor or 2700 R. P. M.

At the same time the throttle rheostats T2 and T3 control the application of signal potential of phase $\varphi 1$ in a manner previously described to control conductor 304 of the manifold pressure motor control circuit 305. This motor control circuit now controls the motor associated therewith to rotate the shaft 308 into a position representative of an increase of manifold pressure to 54 inches of mercury as indicated by the manifold pressure indicators 510 and 512.

As the simulated engine speed increases the slider of the R. P. M. potentiometer RP10 is advanced by the gears interconnecting it with the shaft 122 and the value of the signal potential of phase $\varphi 1$ applied from such slider over conductor 252 through resistance 404 to control conductor 405 of the thrust motor control circuit, represented by the box 406, increases. Since the thrust developed by the engine is a function of the brake horsepower developed by the engine, this thrust potential is a function of the manifold pressure and R. P. M. of the engine, of the setting of the supercharger control, of the setting of the mixture control and of the altitude at which the simulated flight is assumed to be flown. To derive this potential, potential of phase $\varphi 1$ is applied from the 40$\varphi 1$ bus bar over the lower contacts of the EST relay 817, over conductor 838 and through the winding of the manifold pressure potentiometer MPP3 whereby, as the manifold pressure increases, an increasing potential of phase $\varphi 1$ is applied from the slider of such potentiometer, over conductor 253, over the inner lower back contact of the H relay 203 of the R. P. M. circuit, over the inner lower back contact of the L relay 204, over conductor 254, over the lower front contact of the R relay 827 of the engine circuit, assumed to have been operated to simulate an auto rich mixture, over conductor 255, through resistance 256, through the winding of the R. P. M. potentiometer RP10, the first 25 per cent of which winding is shunted by resistance 257, and thence to ground.

In response to the setting of the slider of potentiometer RP10 representative of the engine speed, the potential of phase $\varphi 1$ as derived in accordance with the simulated manifold pressure, as modified by the operation of the automatic rich mixture (R) relay 827 and as further modified by the release or selective operated condition of the L and H supercharger relays 204 and 203, is further modified and applied from the slider of potentiometer RP10, over conductor 252 and through resistance 404 to the control conductor 405 of the thrust motor control circuit.

It is to be noted that this thrust potential is developed as soon as the engine starts and, until the auto rich mixture relay 827 is operated, is reduced by the inclusion of the 550-ohm resistance 839 into the circuit previously traced over which potential was applied to the winding of potentiometer RP10. Thus with no change in the throttle opening, the operation of relay 827 which simulates the change of the mixture from idling cut-off to auto rich is effective to slightly increase the potential applied to the thrust circuit indicative of the increase in power developed when the fuel mixture is enriched. It is to be further noted that with the leading 25 per cent of the winding of potentiometer RP10 shunted by the 125-ohm resistance 257, the potential applied to the thrust circuit increases at a more rapid rate as the engine speed increases beyond 800 R. P. M., that is after the engine is speeded up for take off and for flying.

The potential of phase $\varphi 1$ applied to control conductor 405 causes the thrust motor control circuit to control the motor associated therewith whereby the shaft 407 is rotated in a direction indicative of an increase in thrust and whereby the slider of balancing potentiometer TP10 is advanced toward the No. 3 terminal of its winding to apply balancing potential of phase $\varphi 2$ through resistance 408 to control conductor 405. When this potential is equal to the potential of phase $\varphi 1$ applied from conductor 252 through resistance 404 or as presently described over conductor 409 and through resistance 410 to conductor 405, the motor will stop and the potentiometers driven by the shaft 407, such as potentiometer TP12, will have been adjusted in accordance with the simulated thrust developed by the engine operation.

For deriving the balancing potential of phase $\varphi 2$ the winding of potentiometer TP10 is energized by potential of phase $\varphi 2$ applied thereto under the control of the true air speed motor unit. Until the true air speed exceeds 65 knots or while the simulated flight is still grounded and the 0—65 relay 300 is operated, potential from the 40φ2 bus bar is applied through resistances 320 and 321 in series to ground and a bridge of resistance 321 is established over the inner upper front contact of relay 300, over conductor 322 through the winding of the thrust potentiometer TP10 over conductor 323, over the inner lower front contact of relay 300 and through resistance 324 and the winding of potentiometer TP10 is thus energized whereby the balancing potential of phase φ2 is derived at its slider.

However, when the true air speed increases beyond 65 knots and relay 300 releases, the potential of phase φ2 applied to the winding of potentiometer TP10 is caused to vary in accordance with the true air speed. This is accomplished by energizing the winding of the true air speed autotransformer TAV7 from the 40φ2 bus bar and applying the potential derived at its slider through resistance 325, over the inner upper back contact of relay 300, over conductor 322, through the winding of potentiometer TP10, over conductor 323 and over the inner lower back contact of relay 300 to ground. Thus at speeds above 65 knots the thrust is caused to vary inversely with the true air speed since the true air speed autotransformer TAV7 is included in the balancing leg of the thrust motor control circuit. As the thrust increases the true air speed will increase in the manner described in the application of E. J. Fogarty and R. O. Rippere, Serial No. 622,068, filed concurrently herewith until when it reaches 95 knots take-off of the assumed flight is accomplished and the rate-of-climb indicator of the trainer will show climb and the altimeter will show increasing altitude.

The effect of increasing altitude is felt in the thrust motor control circuit to increase the thrust as the altitude increases in simulation of the reduction of back pressure at the exhaust manifold. This is accomplished by taking potential of phase φ1 derived at the slider of manifold pressure potentiometer MPP3 and applying it through resistance 326 and the winding of altimeter potentiometer AP10 to ground and applying the potential derived at the slider of potentiometer AP10 over conductor 409 and through resistance 410 to control conductor 405 of the thrust motor control circuit.

*Simulation of climbing*

When the rate-of-climb indicator shows that the simulated flight is air-borne, the pilot moves the propeller governor control to a decrease R. P. M. position thereby decreasing the potential of phase φ1 applied from the slider of rheostat P1 operated thereby, over conductor 559 to the lower terminal of the primary winding of input transformer 212 of the No. 1 R. P. M. comparison circuit of Fig. 2. This potential will now be less than the potential of phase φ1 applied under the control of the throttle rheostat T4 over conductor 558 to the upper teminal of the primary winding of input transformer 212. As a consequence the potential induced into the secondary winding of transformer 212 and as amplified by the left unit of voltage amplifier tube 214 will cause tube 215 to fire upon each positive half wave of its plate potential and to transmit an impulse of rectified current from the bus bar 112 through the ballast lamp 219, through the winding of relay 220 in parallel with resistance 221, through the choke coil 222 and over the plate-cathode path through tube 215 to ground.

Relay 220 operates, being held operated between impulses by the action of choke coil 222 and, at its lower contacts establishes a shunt around resistance 217 for the purpose of increasing the bias of tube 215 to assure that it will continue to fire so long as the throttle controlled potential applied over conductor 558 is less than the propeller governor controlled potential applied over conductor 559. Relay 220 also at its upper back contact disconnects conductor 558 from the circuit previously traced over conductor 200 to the control conductor 137 of the R. P. M. motor control circuit and connects conductor 559 over its upper front contact and thence as traced to the control conductor 137.

This propeller governor controlled potential applied over conductor 559 and the circuit traced to conductor 137 being less than the potential previously applied under the control of the throttle rheostat T4 and therefore less than the potential of the phase φ2 applied to conductor 137 by the R. P. M. balancing potentiometer RP1, the R. P. M. motor control circuit controls the motor 116 to rotate the shaft 122 indicative of a reduction in R. P. M. thereby reducing the potential of phase φ2 applied to conductor 137 until it balances the potential of phase φ1 applied by the propeller governor rheostat P1. This reduction in R. P. M. will be indicated by the tachometers 500 and 502. When the tachometer 500 shows an R. P. M. reading of 2550 R. P. M. the pilot will cease moving the propeller governor control. The simulated engine will now continue to simulate an engine speed of 2550 R. P. M. as determined by the setting of the governor control.

The pilot now pulls the throttle back or toward its closed position until the manifold pressure indicators 510 and 512 show readings of 44 inches of mercury which will be the proper manifold pressure for the most efficient operation of the engine at the assumed engine speed of 2550 R. P. M. The operation of the throttle rheostat T4 to reduce the phase φ1 potential applied to conductor 558 will have no effect unless the potential becomes less than the phase φ1 potential applied under the control of propeller governor rheostat P1 and over conductor 559 to the No. 1 R. P. M. comparison circuit. However, the resetting of the T2 and T3 throttle rheostats in response to the partial closure of the throttle will result in a reduction of the phase φ1 potential applied to control conductor 304 of the manifold pressure motor control circuit in the manner previously described. This potential is further reduced as the flight gains altitude by the movement of the slider of the altitude potentiometer AP8. The potential of phase φ2 applied to conductor 304 from the slider of the balancing potentiometer MPP1 being now greater the motor of the manifold pressure unit is controlled to rotate the shaft 308 in a direction representative of a decrease in manifold pressure until the potential of phase φ2 again balances the reduced potential of phase φ1. At such time the shaft 308 will have rotated the rotor of synchro-transmitter 317 to a position such that the synchro-receivers 511 and 513 will have reset the manifold pressure indicators 510 and 512 at the pilot's and instructor's instrument panels to show readings of 44 inches of mercury. The pilot then adjusts the elevator trim control until an air speed of 120 knots and a rate of climb of approximately 4800 feet per minute are indicated. This control and the indicators not being directly concerned with the engine operation have not been disclosed herein but are disclosed in the application of E. J. Fogarty and R. O. Rippere hereinbefore referred to. The pilot may maintain the manifold pressure at 44 inches of mercury as the altitude indication increases by slowly opening the throttle.

As a further result of the reduction of the R. P. M. and manifold pressure the potential of phase $\varphi 1$ applied to control conductor 405 of the thrust motor control circuit 406 is reduced and as a result of the increase in the true air speed following the take-off to 120 knots the potential of phase $\varphi 2$ applied to conductor 405 under the control of the true air speed autotransformer TAV7 is also reduced with the net result that there is slight, if any, change in the position of shaft 407 indicative of the thrust exerted by the engine driven propeller.

*Engine simulation under cruising conditions*

It will be assumed that when the altimeter shows a reading of 1000 feet the pilot desires to level off the flight for cruising. For cruising the mixture control MC is operated to the Auto Lean or neutral position whereupon the previously traced circuit for the R relay 827 is opened thereby extinguishing the Auto Rich lamp at the instructor's desk and a circuit is established over the normal ICO and AR contacts of the switch MC through the Auto Lean lamp to battery to inform the instructor that the mixture control has been operated to the Auto Lean position for most economical cruising conditions. The release of relay 827 again inserts resistance 839 into the previously traced circuit from which potential of phase $\varphi 1$ was derived for application to control conductor 405 of the thrust motor control circuit 406, whereupon the motor thereof operates the shaft 407 in a direction indicative of a slight reduction in the thrust output of the engine due to the leaner fuel mixture.

The operation of shaft 407 causes the movement of the slider of potentiometer TP12 toward the No. 1 terminal of its winding thereby increasing the potential of phase $\varphi 1$ applied from the slider of such potentiometer to control conductor 916 of the cylinder and oil temperature motor control circuit. This potential will also increase as the air speed increases when the assumed flight levels off. However at the same time with the cowl flaps assumed to be opened and the slider of the cowl flap's potentiometer CFP1 at the No. 3 terminal of its winding, a potential of phase $\varphi 2$ which increases as the air speed increases is applied to control conductor 916 with the result that the cylinder and oil temperature motor control circuit is substantially unaffected and no change is made in the reading of the temperature indicators 618 and 620 at the pilot's instrument panel or of the indicators 617 and 619 at the instructor's desk.

For cruising the pilot moves the propeller governor control up further to decrease the R. P. M. until the tachometer 500 reads 2150 R. P. M. The result of this operation is to move the slider of the propeller governor rheostat P1 further toward the No. 3 terminal of its winding thereby further decreasing the potential of phase $\varphi 1$ applied in the manner previously described to control conductor 137 of the R. P. M. motor control circuit with the result that the motor 116 is operated to rotate shaft 122 further in a direction indicative of a reduction in R. P. M. until the potential of phase $\varphi 2$ applied by the balancing potentiometer RP1 balances the new value of the potential of phase $\varphi 1$ applied under the control of the propeller governor rheostat P1. Under the control of the shaft 122 tachometers 500 and 502 will be reset to show an engine speed of 2150 R. P. M.

The pilot will also pull the throttle back or toward its closed position until the manifold pressure indicator 510 shows a manifold pressure of 29 inches of mercury. This is accomplished by the movement of the throttle rheostats T2 and T3 toward the No. 1 terminals of their windings and the consequent reduction of potential of phase $\varphi 1$ applied to control conductor 304 of the manifold pressure motor control circuit. As a result of the reduction of the phase $\varphi 1$ potential, the phase $\varphi 2$ potential applied by the balancing potentiometer MPP1 to conductor 304 is effective to cause the motor associated with the motor control circuit to rotate shaft 308 in a direction such that the adjustment of the slider of potentiometer MPP1 reduces the potential of phase $\varphi 2$ until it balances the new value of the phase $\varphi 1$ potential. Under the control of shaft 308 the manifold pressure indicators 510 and 512 will be reset to show a pressure of 29 inches of mercury.

The pilot now operates the emergency fuel pump switch 552 to the "off" position thereby removing ground from conductor 553 to extinguish the FM-fuel lamp at the instructor's desk and to release the BP relay 903 in the fuel pressure motor circuit. When relay 900 released as previously described it established a circuit from ground over its inner upper back contact, over the lower contacts of relay 906, over the alternate contacts of the switch assembly 909, over the lower front contact of relay 903 and through the winding of the BP1 relay 949 to battery. Relay 949 locked in a circuit over its upper contacts, the alternate contacts of the switch assembly 909, over the lower contacts of relay 906 and to ground at the inner upper back contact of relay 900 independently of the continued operation of relay 903. Now when relay 903 releases, with relay 949 operated, a circuit is established from ground over the lower back contact of relay 903, over the lower contacts of relay 949 and to battery through the winding of the decrease pressure (D) relay 953.

Relay 953 upon operating establishes a circuit through the rotor of the motor 930 which may be traced from such rotor, over the back contacts of relay 907 and over the front contacts of relay 953 to the 50-volt tap of the secondary winding of transformer TR1 and the other terminal of the rotor circuit being connected to the 25-volt tap of the transformer winding. Since the stator winding of the motor is energized over the circuit previously traced the motor now turns in a direction to rotate shaft 932 back toward its normal position. As the cam 16—25 rotates towards normal it permits the spring assembly 909 to restore to its normal position thereby opening the locking circuit of relay 949 which thereupon releases. A circuit is now established for the I relay 907 which may be traced from battery, over the inner upper back contact of relay 900, over the lower contacts of relay 906, over the normal contacts of spring assembly 909, over the inner upper back contact of relay 903, over the upper back contact of relay 908 and to battery through the winding of relay 907. Relay 907 now operates and establishes a previously traced circuit through the rotor winding of motor 930 which now rotates the shaft 932 in a direction representative of an increase in fuel pressure until the 16—25 cam operates the spring assembly 909 to open the circuit of relay 907 which relay then releases to stop the motor. At this time the synchro-transmitter 960 will have been set into a position to cause the fuel pressure gauges 520 and 522 to show a fuel pressure of 16 pounds per square inch, that is the fuel pressure which would be produced in an actual airplane by the engine driven fuel pump.

The pilot now operates the engine cowl flaps handle 563 to the closed position and holds it in such position for six seconds thereby opening the cam operated springs 564 and closing the cam operated springs 572. The closure of springs 572 establishes a circuit from ground over conductor 573, over the lower back contact of the CO relay 621, over the contacts of the L1 limit switch, now closed, and through the winding of the C relay 638 to battery. Relay 638 upon operating short-circuits the left shaded pole winding of motor 600 and the motor now drives the shaft 623 in a direction representative of the closure of the engine cowl flaps so long as the handle 563 is held in the closed position. The rotation of the shaft 623 moves the slider of potentiometer CFP1 towards the No. 1 terminal of its winding to decrease the potential of phase $\varphi 2$ applied to the control conductor 916 of the cylinder and oil temperature motor control circuit which functions in the manner previously described to control the temperature indicators 617, 618, 619 and 620 to show an increase in the cylinder and oil temperature. As the flight is leveled off for cruising by the operation of the elevator trim control (not shown) the air speed of the assumed flight will increase to approximately 185 knots and the potential of phase $\varphi 2$ applied to the winding of the cowl flaps potentiometer CFP1 by the true air speed autotransformer TAV1 will will increase. Also at the same time the true air speed autotransformer TAV1 will increase the potential of phase $\varphi 1$ applied thereby to control conductor 916. The net result is that the summation of phase $\varphi 1$ and $\varphi 2$ potentials applied to control conductor 916 changes the readings of the cylinder temperature indicators 617 and 618 to approximately 180° C. and the readings of the oil temperature indicators 619 and 620 to approximately 60° C. The operation of the cowl flaps handle to the closed position is indicated at the instructor's desk by the lighting of a lamp (not shown).

*Change of engine temperatures by the instructor*

The instructor may for instruction purposes cause the engine temperatures to increase by operating the slider of rheostat 629 toward the left as viewed in Fig. 6 thereby increasing the potential of phase $\varphi 1$ applied to control conductor 916 to cause the motor 950 to advance the sliders of the OIL and CYL potentiometers toward the No. 3 terminals of their windings, or may cause the engine temperatures to decrease by operating the slider of rheostat 629 toward the right thereby increasing the potential of phase $\varphi 2$ applied to control conductor 916 to cause the motor 950 to advance the sliders of the Oil and Cyl potentiometers toward the No. 1 terminals of their windings.

*Change of oil pressure by the instructor*

If the instructor should desire to test the pilot's reaction to a change in oil pressure, he may for example turn the oil pressure key 574 to the decrease position until the oil pressure gauge 532 reads 40 pounds per square inch and then restore the key to normal. This results in the closure of a circuit from ground over the DECR contacts of the key over conductor 575 and through the winding of the DD relay 611 to battery. Relay 611 thereupon operates and establishes a circuit from the 25-volt tap of the secondary winding of transformer TR1, over conductor 914, through the rotor of motor 612, over the upper back contacts of relays 607, 635 and 636, over the lower contacts of relay 611, and conductor 637 to the 35-volt tap of transformer TR1. With the stator winding of the motor energized as previously described, the motor now operates at a slow speed in a direction to rotate shaft 609 to a position representative of a reduction in oil pressure or until the key 574 is released to release relay 611 at which time the oil pressure gauges 530 and 532 will show an oil pressure of 40 pounds per square inch.

If the key 574 is now turned to the increase position until the oil pressure gauge 532 reads 90 pounds per square inch or the oil pressure for normal engine operation and then restored to normal, a circuit is established from ground over the INC contacts of the key, over conductor 576 and through the winding of the ID relay 636 to battery. Relay 636 upon operating establishes a circuit from the 25-volt tap of transformer TR1, over conductor 914, through the rotor circuit, over the upper back contacts of relays 607 and 635, over the front contacts of relay 636 and over conductor 554 to the 15-volt tap of transformer TR1. With the stator winding of the motor energized as previously described the motor now operates at a slow speed in a direction to rotate shaft 609 to a position representative of an increase in oil pressure or until the key 574 is released to release relay 636 at which time the oil pressure gauges 530 and 532 will show an oil pressure of 90 pounds per square inch.

*Change of fuel pressure by the instructor*

To test the reaction of the pilot to a failure of fuel pressure the instructor may turn the fuel pressure key 577 to the decrease position until the fuel pressure gauge 522 shows a reading of zero fuel pressure and then restore the key to normal. This results in the closure of a circuit from ground over the DECR contacts of the key, over conductor 578 and through the winding of the DD relay 955 to battery. Relay 955 thereupon operates to establish a circuit from the 35-volt tap of transformer TR1, through the rotor circuit of the motor 930, over the upper back contacts of relays 907, 953 and 956 and over the upper front contact of relay 955 to the 35-volt tap of transformer TR1. With the stator winding of the motor energized as previously described, the motor now operates at a slow speed in a direction to rotate shaft 932 to a position representative of a reduction of fuel pressure or until the key 577 is released to release relay 955 at which time the fuel pressure gauges 520 and 522 will show a fuel pressure of zero pounds per square inch.

If the key 577 is now turned to the increase position until the fuel pressure gauge 522 reads 16 pounds per square inch or the fuel pressure for normal operation, and is then released to normal, a circuit is established from ground over the INC contacts of the key, over conductor 579 and through the winding of the ID relay 956 to battery. Relay 956 upon operating establishes a circuit through the rotor of motor 930 from the 25-volt tap of transformer TR1, over the upper back contacts of relays 907 and 953, over the upper front contact of relay 956 and to the 15-volt tap of transformer TR1. With the stator winding of the motor energized as previously described, the motor now operates at a slow speed in a direction to rotate shaft 932 to a position representative of an increase in fuel pressure or until the key 577 is restored thus releasing relay 956 at which time the fuel pressure gauges 520 and 522 will show a fuel pressure of 16 pounds per square inch.

*Simulated disabling of the engine*

The instructor may simulate the disabling of the engine by operating the Disable Engine key at his position thereby opening the previously traced circuit for the EST relay 817 of the engine control circuit which thereupon releases and in turn releases the ES relay of the sound effects circuit 824 to stop the simulated engine noise. As a further result of the release of relay 817 the circuit over its upper front contact, over which potential of phase $\varphi 1$ was applied to the No. 3 terminal of the winding of throttle rheostat T4, is opened so that the potential of phase $\varphi 1$ available at the slider of such rheostat and applied over conductor 558 to the input transformer 212 of the No. 1 R. P. M. comparison circuit becomes reduced to ground potential. The potential of phase $\varphi 1$ applied from the slider of the propeller governor rheostat P1 over conductor 559 to the input transformer of the No. 1 R. P. M. comparison circuit now controls and relay 220 of the No. 1 R. P. M. comparison circuit releases, disconnects the potential applied by the propeller governor rheostat P1 from the upper terminal of the primary winding of the input transformer 223 of the No. 2 R. P. M. comparison circuit and connects conductor 558 to such terminal. Since the potential applied over conductor 558 has been reduced to ground potential, the potential applied to the primary winding of the input transformer 223 of the No. 2 R. P. M. comparison circuit is controlled entirely by the true air speed under the control of the true air speed potentiometer TAP8 and autotransformer TAV1 of Fig. 3. Relay 228 of the No. 2 R. P. M. comparison circuit will now release whereby the potential of phase $\varphi 1$ applied over conductor 224 from the slider of the potentiometer TAP8 is now applied over the upper back contact of relay 228 and over conductor 200 to the control conductor 137 of the R. P. M. motor control circuit.

This potential will be less than the potential applied just previous to the operation of the Disable Engine key and as a consequence the motor 116 is operated to turn shaft 122 in a direction representative of a reduction in engine speed. This reduction in engine speed as indicated by the tachometers 500 and 502 simulates the speed at which the engine would be turned over by the windmilling of the propeller and is a function of the true air speed. The reduction of engine speed and the movement of the slider of potentiometer RP10 causes a reduction in the potential of phase $\varphi 1$ applied from such slider to control conductor 405 of the thrust motor control circuit 406 and the motor of such circuit is now operated under the control of the balancing potentiometer TP10 until the potential of phase $\varphi 2$ applied to control conductor 405 balances the signal potential of phase $\varphi 1$. The shaft 407 will now be rotated to a position representative of a reduction in thrust due to the windmilling of the propeller. The reduction in thrust will cause a reduction in air speed, the rate-of-climb indicator of the trainer will show a lower reading and the artificial horizon will indicate a nose down condition.

As a further result of the reduction in engine speed and the resetting of the sliders of the R. P. M. potentiometers RP3 and RP4 the potential of phase $\varphi 1$ applied to the control conductor 304 of the manifold pressure motor control circuit 305 is reduced and the balancing potential of phase $\varphi 2$ applied to conductor 304 by the balancing potentiometer MPP1 is effective to control the motor of such circuit in such a manner that the shaft 308 is rotated in a direction representative of a reduction in manifold pressure which reduced pressure is now indicated by the manifold pressure indicators 510 and 512.

When the instructor releases the Disable Engine key to the "on" position relay 817 reoperates to reoperate the ES relay of the sound effects circuit 824 and to reapply potential of phase $\varphi 1$ to the throttle rheostat T4 whereafter the circuits are returned to the condition for cruising previously described.

*Fuel quantity controls*

It will be assumed that the instructor turns the fuel quantity control for the droppable tank to the "Empty" position thereby opening the contacts 707 to remove ground from conductor 709, whereupon relays 904 and 906 of the fuel pressure circuit both release. Relay 906 upon releasing establishes the circuit of relay 953 which may be traced from ground, over the alternate contacts of the L1 limit switch, over the upper back contact of relay 906, and through the winding of relay 953 to battery. Relay 953 thereupon operates to establish the previously traced circuit for motor 930. The motor now operates in a direction representative of a reduction of fuel pressure until the shaft operated limit switch L1 is released to its normal position in which the circuit of relay 953 is opened and the motor is stopped. Fuel pressure gauges 520 and 522 will now show a reduction of fuel pressure to zero.

With the L1 limit switch in its normal position ground is connected to conductor 911 thereby causing the operation of the no fuel pressure (NFP) relay 816 of the engine control circuit thereby opening the locking circuit of the ST2 relay 822 which releases in turn releasing the EST relay 817. Relay 817 upon releasing causes the stopping of the engine sound effects and causes the simulated R. P. M. to decrease to a value dependent upon the speed at which the engine would be operated due to the wind-milling of the propeller as determined by the true air speed. Also as a result of the reduction in R. P. M. the readings of the manifold pressure indicators 510 512 decrease. These changes in the simulated engine noise, R. P. M. and manifold pressure are brought about by the release of relay 817 in the manner previously described in connection with the disabling of the engine by the operation of the Disable Engine key.

The pilot noting that the engine firing noise has ceased and that the indicated R. P. M. and manifold pressure have decreased, turns the fuel selector valve FSV to the Right main position. Upon leaving the Droppable Tank position the previously traced circuit of the DP relay 700 is opened thereby opening the circuit of the Droppable Tank lamp at the instructor's desk. With the selector valve FSV in the Right Main tank position an obvious circuit is established for the RW relay 702 which establishes a circuit for the Right Wing Tank lamp at the instructor's desk to inform the instructor that the pilot has switched to the right wing tank for fuel supply.

As a further result of the operation of relay 702 and with the right wing tank assumed to be full, ground is connected over the contacts 710, closed except when the right wing tank control RWT is in the empty position, and over the lower contacts of relay 702 to conductor 709. With ground reconnected to conductor 709 relay 904 reoperates and establishes a circuit from ground on conductor 709, over the lower normal contacts of relay 900 and over the inner lower contacts of relay 904 through the winding of relay 906 to battery. Relay 906 now operates and locks over its inner upper contacts and over the lower normal contacts of relay 900 to ground on conductor 709 and establishes the circuit of the I relay 907 which may be traced from ground, over the inner upper back contact of relay 900, over the lower contacts of relay 906, over the normal contacts of spring assembly 909, over the inner upper back contact of relay 903, over the upper back contact of relay 908 and through the winding of relay 907 to battery. Relay 907 thereupon operates and closes the circuit through the rotor circuit of the motor 930 so that the motor now turns the shaft 932 in a direction representative of an increase in fuel pressure until the shaft operated cam 16—25 moves the spring assembly 909 to the alternate position in which the circuit of relay 907 is opened thereby opening the operating circuit of motor 930. The fuel pressure gauges 520 and 522 will now show a fuel pressure of 16 pounds per square inch.

When the limit switch L1 is operated as the shaft 932 rotates, the previously traced circuit for the NFP relay 816 is opened and relay 816 releases and establishes a circuit from ground over the inner upper front contacts of relay 800, over the back contact of relay 816, over the lower contacts of relay 821, over the upper back contact of relay 819, over the upper back contact of GRD relay 840, now released since the flight has been assumed to have left the ground, and through the winding of the ST2 relay 822 to battery. Relay 822 now operates and reestablishes at its lower contacts the previously traced circuit for the EST relay 817 which now operates to reoperate the ES relay of the sound effects circuit 824 and to reapply phase φ1 potential to the throttle rheostat T4 whereafter the circuits all return to the condition for cruising previously described.

Should the instructor now turn the right wing tank control RWT to the empty or E position in simulation of the exhaustion of the fuel in the right wing tank, the contacts 710 will be opened thereby removing ground from conductor 709 unless the pilot has anticipated the emptying of the right wing tank by observing the fuel quantity indicator FQI and has operated the fuel selector valve FSV to another fuel tank selection position as, for example, to the Left Main tank position in which relay 703 is operated to apply ground over the contacts of the switch 711, closed if the left wing tank has fuel in it and over its lower contacts to conductor 709. If ground should be removed from conductor 709 by the operation of the control RWT to the E position before the pilot makes a new fuel tank selection, the fuel pressure circuit will be operated as before described to cause the fuel pressure gauges 520 and 522 to show zero fuel pressure, to cause the engine noise to cease and to cause a reduction in the R. P. M. and manifold pressure indications representative of the reduction of engine speed to the speed incident to the windmilling effect of the propeller.

The quantity of fuel in the right wing tank is indicated by the fuel quantity indicator FQI on the pilot's instrument panel under the control of the rheostat 712 controlled by the RWT tank control at the instructor's desk. The winding of rheostat 712 is energized in a circuit from ground therethrough through the regulating rheostat 713, to the indicator FQI, thence over conductor 714, over the upper contacts of the INS circuit breaker relay 805, and to battery over the lower contacts of relay 800. Direct current potential derived from the slider of rheostat 712 is applied through the regulating rheostat 715 and through an operating winding of the indicator FQI to ground. The indicator is similarly controlled by rheostats 716 and 717 operable by the LWT and RT tank controls at the instructor's desk.

The operation of the LWT and RT controls to their E or empty positions will, when either the left wing or left main and reserve tanks have been selected by the operation of the fuel selector valve FSV, cause the same controls of the fuel pressure and engine control circuits as previously described.

The pilot may simulate the dropping of the droppable tank by closing the switch 718 thereby establishing the circuit of relay 719. The latter relay upon operating closes the circuit of the Droppable Tank Switch lamp at the instructor's desk to inform the instructor that the tank has been dropped and establishes a circuit from battery through the lower winding of the DT relay 705, over the lower contacts of relay 719, over conductor 720, over the contacts of the DT circuit breaker relay 803 and to ground over the upper inner contacts of relay 800. Relay 705 thereupon operates and locks over its upper winding and upper front contact to ground at the back contact of the LK relay 721. Relay 705 also releases the DT1 relay 706 and at its lower contacts removes ground from conductor 709, if the DT relay 700 is at the time operated by the fuel selector valve FSV, to cause the fuel pressure indicator to return to zero and the R. P. M. and manifold pressure indicators to show the lower readings incident to the stoppage of the fuel flow to the engine as previously described.

The instructor can simulate the condition of a dropped tank by turning the Droppable Tank Switch to the No Tank position in which the spring contacts 707 are opened and relay 706 is released. If the pilot should attempt thereafter to use such tank by the operation of the fuel selector valve FSV to the Droppable Tank position, the operation of relay 700 by the valve FSV will be ineffective to apply ground to conductor 709 and the fuel pressure and engine control circuits cannot be operated to indicate the supply of fuel from the droppable tank.

*Simulation of engine operation at altitude*

In the airplane which the trainer is designated to simulate, two blowers are used one of which is driven through gearing having a fixed speed-up ratio and is thus driven whenever the engine is operating and forces the mixture from the carburetor to the intake manifold of the engine under the control of the throttle and the other of which may be driven through a gear shift from the engine shaft. The second blower does not run when the supercharger control is set into its Neutral position but runs at one speed when the control is set into its Low position and runs at a higher speed when the control is set into its High position. This blower supplies air under pressure to the intake of the carburetor, the output pressure of the blower, as determined by the speed at which the blower is driven, being so regulated that it remains substantially constant regardless of a change in altitude.

The effect of the change in speed of the second blower on the manifold pressure is simulated in the trainer by the resistance network controlled by the L and H relays 204 and 203 and the regulation of the output pressure of such blower is simulated by the altimeter potentiometer AP8 and the limit switches L4 and L5 cam driven from the shaft 330 of the altimeter motor unit shown in Fig. 3.

To simulate a climbing maneuver to a high altitude the pilot first advances the mixture control MC to the Auto Rich position thereby causing the operation of the R relay 827 and the changes in the operation of the circuits of the trainer incident thereto as previously described. The pilot then advances the propeller governor control until the tachometers 500 and 502 show increased readings of 2550 R. P. M. The operation of the propeller governor to increase the R. P. M. is effective to increase the phase $\varphi 1$ potential applied under the control of rheostat P1 over conductor 559 to the input of the No. 1 R. P. M. comparison circuit and, with relay 220 thereof operated, over the upper front contact thereof to control conductor 137 of the R. P. M. motor control circuit whereupon the motor thereof rotates the shaft 122 into a position representative of the increase of engine speed to 2550 R. P. M.

The pilot then advances the throttle until the manifold pressure indicators 510 and 512 show readings of 44 inches of mercury. The advance of shaft 308 of the manifold pressure unit into a position representative of the increase of manifold pressure is controlled by the throttle rheostats T2 and T3 in the manner previously described in connection with the simulation of climbing following take-off. The pilot will then pull the stick back or rotate the elevator trim control in the nose-up direction until the air speed indicator reading decreases to 120 knots, the climb indicator shows a steep climb and the altimeter reading increases rapidly.

As the altimeter reading increases the slider of altitude potentiometer AP8 moves towards the No. 3 terminal of its winding and tends to decrease the potential of phase $\varphi 1$ applied as previously described over conductor 232 and through resistance 306 to the control conductor 304 of the manifold pressure motor control circuit 305. To counteract this tendency and to maintain the manifold pressure reading at 44 inches of mercury, which is the pressure for most efficient engine operation, the pilot gradually opens the throttle as the altitude increases thereby increasing the potential of phase $\varphi 1$ applied to the winding of the altimeter potentiometer AP8 under the control of the throttle rheostat T2 so that the potential applied to control conductor 304 remains such as to maintain the manifold pressure motor control circuit unoperated and the readings of the manifold pressure indicators 510 and 512 unchanged at 44 inches of mercury.

The pilot will continue to advance the throttle until it is full open. Thereafter as the altitude continues to increase, the movement of the slider of the altimeter potentiometer AP8 toward the No. 3 terminal of its winding will cause the potential of phase $\varphi 1$ applied to the control conductor 304 of the manifold pressure motor control circuit 305 to decrease continually.

When the pilot notes that the altimeter reads about 10,000 feet he will shift the supercharger control rapidly from Neutral to the Low position. When the control is moved out of the neutral position the Neutral supercharger lamp at the instructor's desk becomes extinguished and when the control reaches its low position a circuit is established from ground over the contacts 570 in their alternate position, over conductor 571 and through the winding of the low speed supercharger (L) relay 204 of Fig. 2 to battery. Relay 204 upon operating establishes a circuit from ground over its next to lower front contact and over conductor 251 and through the Low supercharger lamp at the instructor's desk to battery to inform the instructor that the pilot has operated the supercharger control for simulating the low speed operation of the supercharger blower.

Relay 204 also establishes a shunt of the 20-ohm resistance 210 which it will be recalled was connected in circuit with the throttle controlled rheostat T4 to control the application of a signal potential of phase $\varphi 1$ to the control conductor 137 of the R. P. M. motor control circuit. The result of shunting resistance 210 is to decrease the signal potential slightly, whereupon the motor of the R. P. M. motor control circuit is controlled to rotate the shaft 122 in a direction representative of a reduction in engine speed as indicated by the tachometers 500 and 502. This simulates the reduction in engine speed of an actual airplane resulting from the use of power to operate the supercharger blower at low speed.

As a further result of the operation of relay 204 the resistance network connected between the slider of the throttle rheostat T2 and the input signal conductor 239 over which signal potential of phase $\varphi 1$ was applied to the control conductor 304 of the manifold pressure motor control circuit 305 is so changed as to increase the signal potential and to thereby increase the readings of the manifold pressure indicators 510 and 512 suddenly. With the change in the network a potential of phase $\varphi 1$ as determined by the setting of the throttle rheostat T2 is derived at the midtap of the winding of potentiometer AP8 and applied over the normal contacts of the L4 switch of the altimeter unit, thence over conductor 327, through resistance 258, over the middle upper front contact of relay 204, through the winding of the R. P. M. potentiometer RP3, the lower half of which is shunted over the lower front contact of relay 205 through the 210-ohm resistance 248 and thence through resistances 245 and 246 having a total resistance of 320 ohms, over the next to inner lower front contact of relay 204, over the next to inner lower back contact of relay 203, over the lower front contact of the EST relay 205, over conductors 237 and 238 and to ground over the upper front contact of relay 205. The potential derived at the slider of potentiometer RP3 modified in accordance with the engine speed is then applied over the middle lower front contact of relay 205 and conductor 239 to control conductor 304 of the manifold pressure motor control circuit 305, resulting in a sudden increase in manifold pressure.

The pilot now manipulates the throttle control thereby readjusting the throttle rheostat T2 so that the potential of phase $\varphi 1$ applied over conductor 232 to control conductor 304 of the manifold pressure motor control circuit 305 becomes adjusted to such a value that the manifold pressure unit operates in a manner to maintain the readings of the manifold pressure indicators 510 and 512 at 44 inches of mercury.

Until the limit switch L4 operates, when the altitude has increased to about 17,500 feet, and with the throttle rheostat T2 readjusted as just described, the signal potential of phase $\varphi 1$ applied to conductor 232 remains constant regardless of the movement of the slider of the altimeter potentiometer AP8 as the altitude further increases and consequently the readings of the manifold pressure indicators are maintained at 44 inches of mercury. This simulates the operation of the supercharger blower regulator of an actual airplane to maintain the output pressure of the blower constant regardless of increasing altitude.

When, however, the altitude further increases above 17,500 feet the limit switch L4 is operated to its alternate position in which the center tap connection of the winding of potentiometer AP8 is disconnected and potential of phase $\varphi 1$ is derived from the winding of potentiometer AP8 by the slider of such potentiometer and is applied over conductor 327 and thence over the resistance network determined by the operated condition of the L relay 204 to conductor 232 and thence to control conductor 304 of the manifold pressure motor control circuit 305. Therefore, as the altitude increases above 17,500 feet the potential of phase $\varphi 1$ applied to control conductor 304 continually decreases to cause the reading of the manifold pressure indicators 510 and 512 to decrease.

As the altimeter reading approaches 20,000 feet the pilot, noting that the manifold pressure reading is decreasing continuously due to the further movement of the slider of potentiometer AP8 toward the No. 3 terminal of its winding, will shift the supercharger switch rapidly from its Low to its High position. When the control is moved out of the Low position, the circuit of the L relay 204 is opened and relay 204 releases and extinguishes the Low supercharger lamp at the instructor's desk. When the control reaches the High position a circuit is established from ground over the contacts 580, over conductor 581 and through the winding of the high speed supercharger (H) relay 203 of Fig. 2 to battery. Relay 203 upon operating establishes a circuit from ground over its next to the lower contacts and over conductor 582 through the High supercharger lamp at the instructor's desk to battery to inform the instructor that the pilot has operated the supercharger control for simulating the high speed operation of the supercharger blower.

Relay 203 also establishes a shunt of the two 20-ohm resistances 209 and 210 which it will be recalled were connected in circuit with the throttle rheostat T4 to control the application of a signal potential of phase $\varphi 1$ to control conductor 137 of the R. P. M. motor control circuit. The result of shunting these resistances is to decrease the signal potential slightly, whereupon the motor of the R. P. M. control circuit is controlled to rotate the shaft 122 in a direction representative of a reduction in engine speed as indicated by the tachometers 500 and 502. This simulates the reduction in engine speed of an actual airplane resulting from the use of power to operate the supercharger blower at high speed.

As a further result of the operation of relay 203 the resistance network connected between the slider of throttle rheostat T2 and the input signal conductor 239 over which signal potential of phase $\varphi 1$ was applied to the control conductor 304 of the manifold pressure motor control circuit 305, is so changed as to increase the signal potential to thereby increase the readings of the manifold pressure indicators 510 and 512 suddenly. With the change in the network, a potential of phase $\varphi 1$ as determined by the setting of the throttle rheostat T2, is derived at the mid-tap of the winding of potentiometer AP8 through resistance 328, over the normal contacts of the L5 switch of the altimeter unit thence over conductor 329, over the middle upper front contact of relay 203, over the middle upper back contact of relay 204, through the winding of the R. P. M. potentiometer RP3, the lower half of which is shunted over the lower front contact of relay 203 and through resistances 249 and 248 having a total resistance of 380 ohms and thence through the 275-ohm resistance 245, over the next to inner lower front contact of relay 203, over the lower front contact of the EST relay 205 and over conductors 237 and 238 to ground over the upper front contact of relay 205. The potential derived at the slider of the R. P. M. potentiometer RP3, modified in accordance with the engine speed, is then applied over the middle lower front contact of relay 205 and conductor 239 to control conductor 304 of the manifold pressure motor control circuit 205, resulting in a sudden decrease in indicated manifold pressure to about 44 inches of mercury.

Until the limit switch L5 operates when the altitude has increased to about 22,600 feet and with the throttle rheostat T2 readjusted so that the manifold pressure indicators read about 44 inches of mercury, the signal potential of phase $\varphi 1$ applied to conductor 239 remains constant regardless of the movement of the slider of the altimeter potentiometer AP8 as the altitude further increases and consequently the readings of the manifold pressure indicators are maintained at 44 inches of mercury. This simulates the operation of the supercharger blower regulator to maintain the output blower pressure constant regardless of the increasing altitude.

When, however, the altitude increases above 22,600 feet the limit switch L5 is operated to its alternate position in which the center tap connection from the winding of potentiometer AP8 is discontinued and the potential of phase $\varphi 1$ is derived from the winding of potentiometer AP8 by the slider of such potentiometer and applied over conductor 329 and thence over the resistance network determined with the operated condition of the H relay 203 to conductor 239 thence to control conductor 304 of the manifold pressure motor control circuit 305. Therefore, as the altitude increases above 22,600 feet, the potential of phase $\varphi 1$ applied to control conductor 304 will tend to decrease. The pilot counteracts this trend by advancing the throttle slowly to the full open position as the altitude further increases until when the throttle can be opened no more, the potential of phase $\varphi 1$ will continuously decrease and the indicated manifold pressure will therefore decrease as the altitude approaches 35,000 feet.

Simulation of a descending flight

To simulate a descent the pilot closes the throttle and adjusts the elevator trim to maintain an air speed of about 200 knots. The climb indicator and altimeter will now show a descent. The pilot will also shift the supercharger control back to its Neutral position thereby releasing relay 203, extinguishing the High supercharger lamp at the instructor's desk and lighting the Neutral supercharger lamp. The closing of the throttle moves the slider of the throttle rheostat T4 back to the No. 1 terminal of its winding thereby reducing the potential of phase $\varphi 1$ applied over conductor 558 to the input of the No. 1 R. P. M. comparison circuit. Since this potential is less than the potential of phase $\varphi 1$ applied to such input over conductor 559 under the control of the propeller governor rheostat P1 and relay 220 of the No. 1 R. P. M. comparison circuit is not operated, but relay 228 of the No. 2 R. P. M. comparison circuit is still operated, the potential applied to conductor 558 by the throttle rheostat T4 is applied to control conductor 137 of the R. P. M. motor control circuit and, being less than previously applied, the motor control circuit functions to reduce the engine speed as indicated by the tachometers 500 and 502. At the same time the setting of the throttle rheostats T2 and T3 at the No. 1 terminals of their windings reduces the potential of phase $\varphi 1$ applied under the control of rheostat T2 to control conductor 304 of the manifold pressure motor control circuit 305 to substantially zero while at the same time the potential of phase $\varphi 1$ applied under the control of rheostat T3 to conductor 304 is increased. The net result is that the manifold pressure motor control circuit is controlled to reduce the manifold pressure.

Approach and landing

When the altimeter reading has decreased to about 2,000 feet the pilot will open the throttle until, under the control of the throttle rheostats T2 and T3, the manifold pressure motor control circuit will have functioned in the manner previously described to set the manifold pressure indicators to read about 16 inches of mercury. He then reduces the air speed by turning the elevator trim control or by moving the stick back in the nose-up direction until the air speed is reduced to about 120 knots. The pilot then operates the wing flaps switch to lower the wing flaps, further reduces the air speed to about 90 knots by means of the stick and then lowers the landing gear. As the altimeter reading approaches zero he reduces the air speed reading to about 80 knots and maintains a climb indicator reading of about 300 feet per minute down by means of the stick and throttle. As soon as the altimeter reading reaches zero he closes the throttle and the climb indicator reads zero and the air speed indicator reading returns to zero.

Stopping the engine

To stop the engine the mixture control MC is moved to the idle cut-off or ICO position whereby the R relay 827 is released thereby extinguishing the "auto rich" lamp at the instructor's desk and establishing the previously traced circuit for the ICO relay 808 which establishes the previously traced circuit for the ICO lamp at the instructor's desk to inform the instructor that the pilot has changed the fuel mixture. When relay 808 operates, it opens the circuit of the EST relay 817 which releases and opens the circuit over which potential was applied to the winding of throttle rheostat T4. No potential of phase $\varphi 1$ will now be applied to control conductor 137 of the R. P. M. motor control circuit and under the control of the balancing potentiometer RP1 the shaft 122 of the motor unit will be returned to its normal position in which the tachometers 500 and 502 will be operated to show zero readings indicative of the fact that the engine has stopped. With the slider of the R. P. M. autotransformer RV1 returned to its normal position the engine vibration ceases.

When the shaft 122 of the R. P. M. motor unit reaches its normal position the L1 limit switch operates to remove ground from conductor 134 thereby releasing the "on" relay 821 of the engine control circuit and the EST relay 205 of the R. P. M. circuit. With relay 205 now released and the sliders of the R. P. M. potentiometers RP3 and RP4 set to the No. 1 terminals of their windings, the manifold pressure motor control circuit 305 is controlled by the throttle rheostats T2 and T3 in the manner previously described in connection with the setting of the manifold pressure indicators prior to the starting of the engine, to set the shaft 308 into a position representative of a manifold pressure of 30 inches of mercury as will be indicated by the manifold pressure indicators 510 and 512.

The operation of the L1 limit switch of the R. P. M. motor unit is also effective to connect ground to conductor 901 to thereby cause the operation of the EN relay 900 of the fuel pressure motor circuit. Relay 900 upon operating opens the locking circuit of relay 906 which thereupon releases and establishes a circuit from ground over the alternate contacts of the L1 limit switch, over the upper back contact of relay 906 and through the winding of relay 953 to battery. Relay 953 thereupon establishes a previously traced circuit for motor 930 to cause such motor to turn shaft 932 back to its normal position, in which position the limit switch L1 opens the circuit of relay 953 to thereby stop the motor. With the rotation of the shaft 932 into its normal position the fuel pressure gauges 520 and 522 will be operated to indicate a zero fuel pressure.

Relay 900 upon operating also establishes a circuit from ground over its upper front contact, over conductor 957, over the upper back contact of the DC relay 608 and through the winding of the D relay 635 of the oil pressure circuit to battery. Relay 635 upon operating establishes a circuit through the rotor circuit of motor 612 which may be traced from one brush of the motor, over the upper back contact of relay 607, over the front contact of relay 635, over conductor 639 to the 50-volt tap of the secondary winding of transformer TR1 and from the other brush of the motor over conductor 914 to the 15-volt tap of the transformer. Since the stator winding of the motor is energized as previously described, the motor is operated so as to rotate shaft 609 in a direction representative of a decrease in oil pressure thereby causing the oil pressure gauges 530 and 532 to show decreasing oil pressure readings. When the shaft 609 reaches its normal position the L1 limit switch establishes the circuit of relay 608 which upon operating opens the circuit of relay 635 which then releases to open the circuit of motor 612. At this time the pressure gauges will show a zero oil pressure.

As a further result of the release of EST relay 817, potential is removed from the winding of the thrust potentiometer TP12 with the further result that potential of phase φ1 is removed from the control conductor 916 of the cylinder and oil temperature motor control circuit and such circuit is now controlled by potential of phase φ2 applied to the control conductor 916 from the slider of balancing potentiometer "bal" in such a manner as to return shaft 912 to its normal position in which position the limit switch L1 causes the motor 950 to stop. The resetting of the sliders of the potentiometers "Oil" and "Cyl" will now cause the oil temperature indicators 619 and 620 and the cylinder temperature indicators 517 and 618 to show readings of 15° C.

The pilot then restores the ignition key to its "Off" position in which ground is connected to both conductors 550 and 551 to thereby cause the operation of both magneto relays 809 and 810 which, upon operating, open the circuit of relay 817 at a further point. With relays 809 and 810 both operated, the L Mag and R Mag lamps at the instructor's desk both become extinguished to indicate to the instructor that both magnetos have been disconnected. The pilot may then restore the operated relays 802, 804, 805 and 803 by releasing relay 800 through the opening of battery switch 537, the GEN relay 841 having released when ground was removed from conductor 842 at the time the RPM shaft 122 restored to normal indicating that the engine had stopped. Other circuit breaker relays of the trainer similar to relay 802 are also released upon the release of relays 800 and 841.

The instructor may simulate the blowing of any circuit-breaker by operating a corresponding switch at his desk for a period of about ten seconds. The EM-fuel, St, INS and DT switches corresponding to relays 804, 802, 805 and 803 are shown in Fig. 6. Each of these switches has an associated lamp, not shown. For example, if the switch EM-fuel is operated battery is connected thereover, over conductor 640 and through the circuit-breaker 542 to ground. After about ten seconds the thermal circuit-breaker opens and the operated EMF relay 804 releases and the corresponding circuit-breaker lamp at the instructor's desk lights to show that the circuit breaker has blown. When the pilot recloses the circuit-breaker 542 after the switch EM-fuel has been released at the instructor's desk, the relay 804 reoperates and extinguishes the circuit breaker lamp.

What is claimed is:

1. In an aircraft trainer wherein the operation of an engine is simulated, a pilot's station, a simulated propeller governor control and a simulated throttle at said station, a source of current, a control conductor, a rheostat operable by said propeller governor control for deriving a first potential from said source which varies with the setting of said control, a rheostat controlled by said throttle for deriving a second potential from said source which varies with the throttle opening, means for applying said derived potentials to said conductor, means for comparing said potentials and effective to control said potential applying means to discontinue the application of said second potential to said conductor and for enabling the application of said first potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero; an instructor's desk, and simulated tachometers at said pilot's station and at said desk controlled by said motor for indicating the revolutions per minute of the simulated engine.

2. In an aircraft trainer wherein the operation of an aircraft engine is simulated, a pilot's station, a simulated propeller governor control and a simulated throttle at said station, a source of current, a control conductor, a rheostat operable by said propeller governor control for deriving a first potential from said source which varies with the setting of said control, a rheostat controlled by said throttle for deriving a second potential from said source which varies with the throttle opening, a relay controllable to apply said derived potentials to said conductor, means for comparing said potentials and effective to operate said relay to discontinue the application of said second potential to said conductor and to apply said first potential to said conductor when said second potential becomes greater than said first potential, a balancing potentiometer for deriving a potential from said source and for applying it to said conductor, a motor responsive to an unbalanced potential condition on said conductor for adjusting said balancing potentiometer until the sum of the potentials applied to said conductor becomes zero, an instructor's desk, and simulated tachometers at said pilot's station and at said desk controlled by said motor for indicating the revolutions per minute of the simulated engine.

3. In an aircraft trainer wherein the operation of an aircraft engine is simulated, a pilot's station, a simulated propeller governor control and a simulated throttle at said station, a source of current, a control conductor, a rheostat operable by said propeller governor control for deriving a first potential from said source which varies with the setting of said control, a rheostat controlled by said throttle for deriving a second potential from said source which varies with the throttle opening, means for deriving a third potential from said source which varies with the air speed of a simulated flight, a relay controllable to apply said derived potentials to said conductor, means for comparing either said first or said second potential with said third potential and effective to operate said relay to cause the application of either said first or said second potential to said conductor and to discontinue the application of said third potential to said conductor when either said first or second potential is greater than said third potential, a balancing potentiometer for deriving a potential from said source and for applying it to said conductor, a motor responsive to an unbalanced potential condition on said conductor for adjusting said balancing potentiometer until the sum of the potentials applied to said conductor becomes zero, an instructor's desk, and simulated tachometers at said pilot's station and at said desk controlled by said motor for indicating the revolutions per minute of the simulated engine.

4. In an aircraft trainer wherein the operation of an aircraft engine is simulated, a pilot's station, a simulated propeller governor control and a simulated throttle at said station, a source of current, a control conductor, a rheostat operated by said propeller governor control for deriving a first potential from said source which varies with the setting of said control, a rheostat controlled by said throttle for deriving a second potential from said source which varies with the throttle opening, means for modifying said latter potential in accordance with the air speed of a simulated flight, a relay controllable to apply said first derived potential and said modified potential to said conductor, means for comparing said potentials and effective to operate said relay to discontinue the application of said modified potential to said conductor and to apply said first potential to said conductor when said modified potential becomes greater than said first potential, a balancing potentiometer for deriving a potential from said source and for applying it to said conductor, a motor responsive to an unbalanced potential condition on said conductor for adjusting said balancing potentiometer until the sum of the potentials applied to said conductor becomes zero, an instructor's desk, and simulated tachometers at said pilot's station and at said desk controlled by said motor for indicating the revolutions per minute of the simulated engine.

5. In an aircraft trainer wherein the operation of an aircraft engine is simulated, a pilot's station, a simulated propeller governor control and a simulated throttle at said station, an instructor's desk, a key at said desk operable to simulate the disabling of the aircraft engine, a source of current, a control conductor, a rheostat operable by said propeller governor control for deriving a first potential from said source which varies with the setting of said control, a rheostat controlled by said throttle for deriving a second potential from said source which varies with the throttle opening, a first relay controllable to apply said derived potentials to said conductor, means for comparing said potentials and effective to operate said relay to discontinue the application of said second potential to said conductor and to apply said first potential to said conductor when said second potential becomes greater than said first potential, means for deriving a third potential from said source which varies with the air speed of a simulated flight, means for comparing said third potential with either said first or said second potential, a relay operable when either said first or second potential is less than said third potential for applying said third potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, simulated tachometers at said pilot's station and at said desk controlled by said motor for indicating the revolutions per minute of the simulated engine, and means responsive to the operation of said key for reducing said second potential to an extent such that said third potential becomes effective to control said motor in simulation of the wind-milling of the engine driven propeller in accordance with the air speed when the engine is dead.

6. In an aircraft trainer wherein the operation of an aircraft engine is simulated, a source of current, a control conductor, a potentiometer for deriving a potential from said source commensurate with the simulated manifold pressure of a simulated airplane engine, means for modifying said derived potential in accordance with whether said engine is assumed to be operating on a rich or a lean fuel mixture, a potentiometer for further modifying said potential in accordance with the simulated speed of rotation of the simulated engine, means for further modifying said potential in accordance with the speed of a simulated supercharger blower, said modified potential being then applied to said conductor, a potentiometer for deriving a potential from said source in accordance with the altitude at which a simulated flight is being conducted and for applying it to said conductor, means for deriving a potential from said source which varies inversely with the true air speed of the simulated flight, a balancing potentiometer for modifying said latter potential and for applying it to said conductor, a motor responsive to an unbalanced potential condition on said conductor for adjusting said balancing potentiometer until the sum of the potentials applied to said conductor becomes zero, and means operated by said motor for introducing integration factors into other motor control circuit networks in the trainer in accordance with the thrust output of the simulated engine.

7. In an aircraft trainer wherein the operation of an aircraft engine is simulated, a source of current, a control conductor, a potentiometer for deriving a potential from said source commensurate with the simulated manifold pressure of a simulated airplane engine, means for modifying said derived potential in accordance with whether said engine is assumed to be operating on a rich or a lean fuel mixture, a potentiometer for further modifying said potential in accordance with the simulated speed of rotation of the simulated engine, means for further modifying said potential in accordance with the speed of a simulated supercharger blower, said modified potential being then applied to said conductor, a potentiometer for deriving a potential from said source which varies directly with the altitude at which a simulated flight is being conducted and for applying it to said conductor, a balancing potentiometer for applying a potential of opposite phase to said derived potentials to said conductor, means for deriving a potential from said source for energizing said latter potentiometer, means effective when the true air speed of a simulated flight rises above a determined value for causing said latter potential to vary in accordance with the true air speed, a motor responsive to an unbalanced potential condition on said conductor for adjusting said balancing potentiometer until the sum of the potentials applied to said conductor becomes zero, and means operated by said motor for introducing integration factors into other motor control circuit networks in the trainer in accordance with the thrust output of the simulated engine.

8. In an aircraft trainer for simulating the operation of an airplane engine, a source of current, a control conductor, an instructor's desk, a pilot's station in said trainer, a simulated throttle controllable from said station, a first rheostat operated by said throttle for deriving a potential from said source which increases as the throttle opens, a potentiometer for increasing said potential in accordance with the simulated increase in speed of rotation of the simulated engine and for applying the modified potential to said conductor, a second rheostat operable by said throttle for deriving a potential from said source which decreases as the throttle opens, a potentiometer for decreasing said latter potential in accordance with the simulated increase in speed of rotation of the simulated engine and for applying the modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and simulated instruments at said desk and at said pilot's station controlled by said motor for first indicating a decrease in manifold pressure until the speed of the simulated engine reaches a predetermined value and for thereafter indicating an increase in manifold pressure as the engine speed increases above the determined value.

9. In an aircraft trainer for simulating the operation of an airplane engine, a source of current, a control conductor, an instructor's desk, a pilot's station in said trainer, a simulated throttle controllable from said station, means for simulating the speed control of a supercharger blower, a first rheostat operated by said throttle for deriving a potential from said source which increases as the throttle opens, means for modifying said potential in accordance with the setting of the supercharger blower simulating means, a potentiometer for increasing said latter modified potential in accordance with the simulated increase in speed of rotation of the simulated engine, means for applying said modified potential to said conductor, a second rheostat operable by said throttle for deriving a potential from said source which decreases as the throttle opens, a potentiometer for decreasing said latter potential in accordance with the simulated increase in speed of the simulated engine and for applying such modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and simulated instruments at said desk and at said pilot's station controlled by said motor for first indicating a decrease in manifold pressure until the speed of the simulated engine reaches a predetermined value and for thereafter indicating an increase in manifold pressure as the engine speed increases above the determined value.

10. In an aircraft trainer for simulating the operation of an airplane engine, a source of current, a control conductor, an instructor's desk, a pilot's station in said trainer, a simulated engine throttle controllable from said station, a first rheostat operable by said throttle for deriving a potential from said source which increases as the throttle opens, a potentiometer for modifying said derived potential in accordance with the altitude at which a simulated flight is being conducted, a potentiometer for further modifying said potential in accordance with the simulated speed of rotation of the simulated engine, means for further modifying said potential in accordance with whether the neutral, low or high speed operation of a supercharger blower is being simulated, means for applying said modified potential to said conductor, a second rheostat operable by said throttle for deriving a potential from said source which decreases as the throttle opens, a potentiometer for decreasing said latter potential as the speed of rotation of the simulated engine increases and for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, means operated by said motor for introducing integration factors into other motor control circuit networks of the trainer commensurate with the manifold pressure of the simulated engine, and simulated instruments at said desk and at said pilot's station controlled by said motor for first indicating a decrease in manifold pressure until the speed of the simulated engine reaches a determined value and for thereafter indicating an increase in manifold pressure as the engine speed increases above the determined value.

11. In an aircraft trainer for simulating the operation of an airplane engine, a source of current, a control conductor, an instructor's desk, a pilot's station in said trainer, a simulated engine throttle controlled from said station, means operable from said throttle for deriving a potential from said source which varies with the throttle opening, means for modifying said potential in accordance with the altitude at which a simulated flight is being conducted, a potentiometer for further modifying said potential in accordance with the simulated speed of rotation of the simulated engine and for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, simulated instruments at said desk and at said pilot's station controlled by said motor and indicating a steadily decreasing manifold pressure after the throttle has been fully opened and the altitude continues to increase, a relay operable to simulate a change in speed of a supercharger blower, and means effective upon the operation of said relay to cause a sudden increase in the modified potential applied to said conductor to thereby cause a sudden increase in the indicated manifold pressure.

12. In an aircraft trainer for simulating the operation of an airplane engine, a source of current, a control conductor, an instructor's desk, a pilot's station in said trainer, a simulated engine throttle controlled from said station, means operable from said throttle for deriving a potential from said source which varies with the throttle opening, a potentiometer for modifying said potential in accordance with the altitude at which a simulated flight is being conducted, a potentiometer for further modifying said potential in accordance with the simulated speed of rotation of the simulated engine and for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, simulated instruments at said desk and at said pilot's station controlled by said motor for indicating a steadily decreasing manifold pressure after the throttle has been fully opened and the altitude continues to increase, a relay operable to simulate a change in speed of a supercharger blower, means effective upon the operation of said relay to cause a sudden increase in the modified potential applied to said conductor and to cause said potential to be maintained at its increased value whereby said indicators are operated to show a sudden and maintained increase in manifold pressure, and a switch operable when a predetermined simulated altitude is attained to again cause said modified potential to steadily decrease as the altitude increases above said value whereby said indicated manifold pressure steadily decreases.

13. In an aircraft trainer for simulating the operation of an airplane engine, a source of current, a control conductor, an instructor's desk, a pilot's station in said trainer, a simulated engine throttle controlled from said station, means operable from said throttle for deriving a potential from said source which varies with the throttle opening, a potentiometer for modifying said potential in accordance with the altitude at which a simulated flight is being conducted, a potentiometer for further modifying said potential in accordance with the simulated speed of rotation of the simulated engine and for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, simulated instruments at said desk and at said pilot's station controlled by said motor and indicating a steadily decreasing manifold pressure after the throttle has been fully opened and the altitude continues to increase, a relay operable to simulate a change to a low speed operation of a supercharger blower, means effective upon the operation of said relay to cause a sudden increase in the modified potential applied to said conductor and to cause said potential to be maintained at its increased value as the altitude further increases whereby said indicators are operated to show a sudden and maintained increase in manifold pressure, and a switch operable when a predetermined simulated altitude is attained to again cause said modified potential to steadily decrease as the altitude increases above said value whereby said indicated manifold pressure steadily decreases.

14. In an aircraft trainer for simulating the operation of an airplane engine, a source of current, a control conductor, an instructor's desk, a pilot's station in said trainer, a simulated engine throttle controlled from said station, means operable from said throttle for deriving a potential from said source which varies with the throttle opening, a potentiometer for modifying said potential in accordance with the altitude at which a simulated flight is being conducted, a potentiometer for further modifying said potential in accordance with the simulated speed of rotation of the simulated engine and for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, simulated instruments at said desk and at said pilot's station controlled by said motor and indicating a steadily decreasing manifold pressure after the throttle has been fully opened and the altitude continues to increase, a relay operable to simulate a change from a low speed to a high speed operation of a supercharger blower, means effective upon the operation of said relay to cause a sudden increase in the modified potential applied to said conductor and to cause said potential to be maintained at its increased value as the altitude further increases whereby said indicators are operated to show a sudden and maintained increase of manifold pressure, and a switch operable when a predetermined simulated altitude is attained to again cause said modified potential to steadily decrease as the altitude increases above said value whereby said increase in manifold pressure steadily decreases.

15. In an aircraft trainer wherein the starting of an engine is simulated, a pilot's station in said trainer, an instructor's desk, a switch at said desk operable to simulate the placing of a starting cartridge in the engine, a relay responsive to the operation of said switch, a starter switch at said pilot's station operable to simulate the firing of the starting cartridge, a relay responsive to the operation of said latter switch, means jointly responsive to the operation of said relays for simulating the operation of the engine in response to the firing of a starting cartridge, and simulated tachometers at said desk and at said pilot's station operable by said latter means for indicating the speed of rotation attained by the engine from the firing of the starting cartridge.

16. In an aircraft trainer wherein the starting of an engine is simulated, a pilot's station in said trainer, an instructor's desk, a switch at said desk operable to simulate the placing of a starting cartridge in the engine, a relay responsive to the operation of said switch, a starting switch at said pilot's station operable to simulate the firing of the starting cartridge, a relay responsive to the operation of said latter switch, means jointly responsive to the operation of said relays for simulating the operation of the engine in response to the firing of a starting cartridge, a simulated fuel selector valve switch and a simulated fuel pressure pump switch at said pilot station, means responsive to the operation of said latter switches for simulating the production of fuel pressure in the fuel supply system of an airplane, a simulated engine priming switch and a simulated ignition switch at said pilot's station, means jointly responsive to said latter switches and to said fuel pressure simulating means for controlling said engine operation simulating means in a manner representative of an increase in engine speed due to power impulses developed thereby, and simulated tachometers at said desk and at said pilot's station for indicating the speed of the simulated engine.

17. In an aircraft trainer wherein the starting of an engine is simulated, a pilot's station in said trainer, a fuel selector valve switch at said station operable to simulate the selection of a fuel supply tank, an emergency fuel pump switch at said station operable to simulate the operation of an emergency fuel pump to pump fuel from the selected tank to the fuel supply system of an airplane, means jointly responsive to the operation of said switches for simulating the production of the fuel pressure incident to the operation of an emergency fuel pump, and simulated pressure gauges at said desk and at said pilot's station operable by said means for indicating the fuel pressure.

18. In an aircraft trainer wherein the starting of an engine is simulated, a pilot's station in said trainer, a fuel selector valve switch at said station operable to simulate the selection of a fuel supply tank, an emergency fuel pump switch at said station operable to simulate the operation of an emergency fuel pump to pump fuel from the selected tank to the fuel supply system of an airplane, a source of power, a motor, a relay jointly controlled by said switches to connect said motor to said source of power, simulated pressure gauges at said desk and at said pilot's station operable by said motor, and a switch controlled by said motor for causing the release of said relay to stop said motor when said gauges have been operated to indicate a simulated value of fuel pressure which would be obtained by the operation of the emergency fuel pump of an airplane.

19. In an aircraft trainer wherein the starting of an engine is simulated, a pilot's station in said trainer, a fuel selector valve switch at said station operable to simulate the selection of a fuel supply tank, an emergency fuel pump switch at said station operable to simulate the operation of an emergency fuel pump to pump fuel from the selected tank to the fuel supply system of an airplane, means jointly responsive to the operation of said switches for simulating the production of the fuel pressure incident to the operation of an emergency fuel pump, simulated pressure gauges at said desk and at said station operable by said means for indicating the fuel pressure, means for simulating the operation of an engine on fuel supplied to the fuel supply system, and means controlled by said latter means for controlling said fuel pressure simulating means to operate said gauges to show the simulated increase of fuel pressure incident to the operation of an engine driven fuel pump.

20. In an aircraft trainer wherein the starting of an engine is simulated, a pilot's station in said trainer, a fuel selector valve switch at said station operable to simulate the selection of a fuel supply tank, an emergency fuel pump switch at said station operable to simulate the operation of an emergency fuel pump to pump fuel from the selected tank to the fuel supply system of an airplane, a source of power, a motor, a relay jointly controlled by said switches to connect said motor to said source of power, simulated pressure gauges at said desk and at said station operable by said motor, a switch controlled by said motor for causing the release of said relay to stop said motor when said gauges have been operated to indicate the simulated value of fuel pressure which would be obtained by the operation of the emergency fuel pump of an airplane, means for simulating the operation of an airplane engine by fuel supplied to the fuel supply system, a relay controlled by said latter means to cause the reoperation of said first relay, and a second switch operable by said motor for causing the release of said first relay to stop said motor when said gauges have been operated to indicate the simulated value of the fuel pressure which would be obtained by the concurrent operation of an emergency fuel pump and a fuel pump driven by the engine.

21. In an aircraft trainer wherein the starting of an engine is simulated, a pilot's station in said trainer, a fuel selector valve switch at said station operable to simulate the selection of a fuel supply tank, an emergency fuel pump switch at said station operable to simulate the operation of an emergency fuel pump to pump fuel from the selected tank to the fuel supply system of an airplane, means responsive to the operation of said switches for simulating the production of fuel simulated pressure in the fuel system of an airplane, pressure gauges at said desk and at said station operable by said means for indicating the fuel pressure, means for simulating the operation of an engine on fuel supplied to the fuel supply system, a fuel quantity control switch at said desk operable to simulate the depletion of fuel in the tank selected by the operation of said fuel selector valve switch, and means controlled by said latter switch for causing said fuel pressure simulating means to operate said gauges to show a simulated decrease in fuel pressure to zero and to cause said engine operation simulating means to assume a condition indicative of the stopping of the engine for lack of fuel.

CHARLES E. GERMANTON.

REFERENCES CITED

The following references are of record in the file of this patent:

UNITED STATES PATENTS

| Number | Name | Date |
|---|---|---|
| 2,099,857 | Link, Jr. | Nov. 23, 1937 |
| 2,218,546 | Muller | Oct. 22, 1940 |
| 2,327,997 | Carmody et al. | Aug. 31, 1943 |
| 2,372,741 | Roberts-Horfsfield, Jr., | Apr. 3, 1945 |
| 2,439,168 | Kail | Apr. 6, 1948 |
| 2,450,261 | West | Sept. 28, 1948 |